(12) United States Patent
Nishiyama et al.

(10) Patent No.: US 9,953,605 B2
(45) Date of Patent: Apr. 24, 2018

(54) ACTIVE MATRIX SUBSTRATE AND DISPLAY PANEL

(71) Applicant: Sharp Kabushiki Kaisha, Sakai, Osaka (JP)

(72) Inventors: Takayuki Nishiyama, Sakai (JP); Kohhei Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/316,185

(22) PCT Filed: Jun. 5, 2015

(86) PCT No.: PCT/JP2015/066395
§ 371 (c)(1),
(2) Date: Dec. 5, 2016

(87) PCT Pub. No.: WO2015/186832
PCT Pub. Date: Dec. 10, 2015

(65) Prior Publication Data
US 2017/0154596 A1     Jun. 1, 2017

(30) Foreign Application Priority Data

Jun. 6, 2014 (JP) .................................. 2014-118048

(51) Int. Cl.
*G09G 3/36* (2006.01)
*G02F 1/1362* (2006.01)
(Continued)

(52) U.S. Cl.
CPC ......... *G09G 3/3677* (2013.01); *G02F 1/1345* (2013.01); *G02F 1/1368* (2013.01);
(Continued)

(58) Field of Classification Search
CPC .............. G09G 3/3677; G09G 3/3696; G09G 2310/0289; G09G 2310/0291;
(Continued)

(56) References Cited

U.S. PATENT DOCUMENTS

2005/0225690 A1    10/2005    Battersby
2008/0018583 A1     1/2008    Knapp et al.
(Continued)

FOREIGN PATENT DOCUMENTS

JP    2005-528644 A    9/2005
JP    5299730 B2       9/2013

*Primary Examiner* — Abhishek Sarma
(74) *Attorney, Agent, or Firm* — Keating & Bennett, LLP

(57) ABSTRACT

Provided is an active matrix substrate that includes a gate line group, a source line group, a pixel electrode arranged in a display area, and a gate line driving circuit (11) formed in the display area. The gate line driving circuit (11) includes an accumulation line that accumulates a voltage for controlling the voltage level of the gate line; an output unit (U1) that controls the voltage level of the gate line according to the voltage of the accumulation line; an accumulated voltage supply unit (U2) that varies the voltage of the accumulation line according to a signal input from another gate line; and accumulated voltage adjustment units (U3) that change the voltage of the accumulation line to a predetermined level according to the control signal. The output unit (U1), the accumulated voltage supply unit (U2), and, the accumulated voltage adjustment units (U3) are arrayed along the gate line, and the output unit (U1) is arranged at a position interposed between the accumulated voltage adjustment units (U3).

11 Claims, 30 Drawing Sheets

(51) Int. Cl.
*G02F 1/1345* (2006.01)
*G02F 1/1368* (2006.01)

(52) U.S. Cl.
CPC ..... *G02F 1/136286* (2013.01); *G09G 3/3696* (2013.01); *G02F 2201/123* (2013.01); *G09G 2310/0243* (2013.01); *G09G 2310/0289* (2013.01); *G09G 2310/0291* (2013.01); *G09G 2310/08* (2013.01)

(58) Field of Classification Search
CPC ........ G09G 2310/0243; G09G 2310/08; G02F 1/1368; G02F 1/1345; G02F 1/136286; G02F 2201/123
See application file for complete search history.

(56) References Cited

U.S. PATENT DOCUMENTS

| | | | |
|---|---|---|---|
| 2008/0088568 A1 | 4/2008 | Haga et al. | |
| 2010/0111245 A1* | 5/2010 | Tobita | G11C 19/184 377/64 |
| 2011/0102409 A1* | 5/2011 | Hayakawa | H01L 27/1225 345/212 |
| 2014/0306948 A1* | 10/2014 | Iwamoto | G09G 3/3648 345/213 |

* cited by examiner

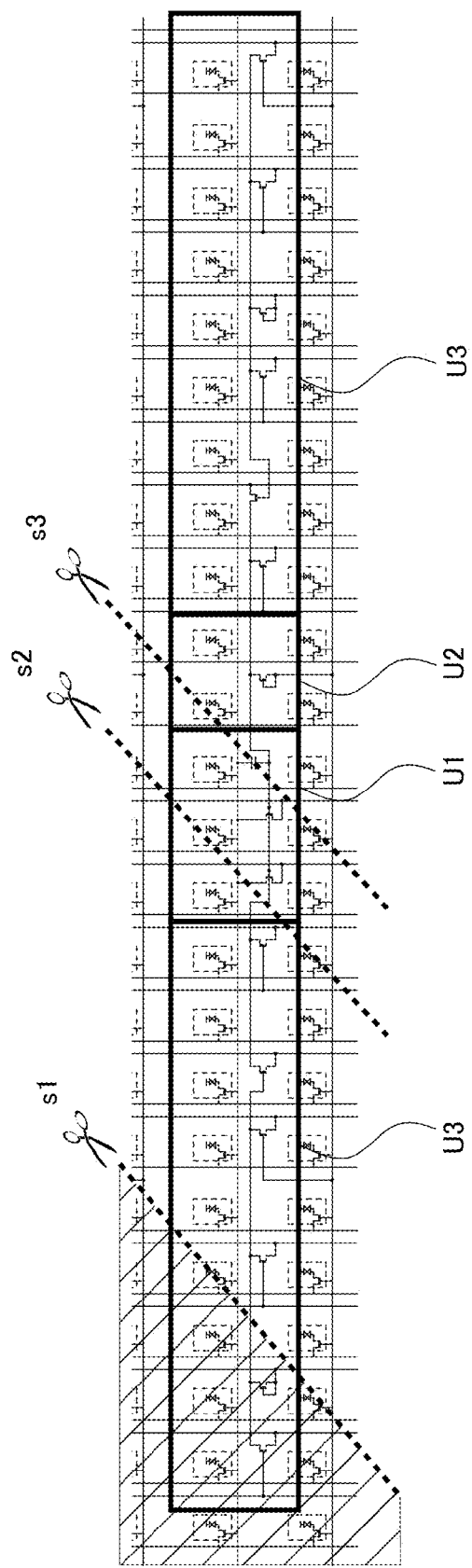

ACTIVE MATRIX SUBSTRATE AND DISPLAY PANEL

TECHNICAL FIELD

The present invention relates to an active matrix substrate and a display panel.

BACKGROUND ART

Conventionally, a display panel having such a configuration that a gate driver and a source driver are formed on two adjacent sides of an active matrix substrate in a rectangular shape has been known. If an end of such an active matrix substrate is cut, the gate driver or the source driver provided on the end is cut, which results in that the display panel cannot be driven. For this reason, it is difficult to produce a non-rectangular deformed panel by cutting an active matrix substrate in a rectangular shape.

A conventional deformed panel therefore in some cases has such a configuration that drivers are arranged along edges of a non-rectangular pixel region (display area). For example, in the case of a display device disclosed in JP-T-2005-528644, row driver circuit units and column driver circuit units are alternately arranged along an outer circumference of an array having a non-rectangular outer shape. As another example, the specification of US Patent Application Publication No. 2008/0018583 discloses a display device in which a display pixel array in a non-rectangular outer shape is arranged on a substrate. This display device includes row conductors connected to pixels of each row, column conductors connected to pixels of each column, and spurs that are connected to the row conductors, respectively, and led out of the array. Further, as another example, the publication of Japanese Patent No. 5299730 discloses a display device in which a plurality of pairs of a pixel circuit and a unit pixel that outputs a scanning signal to the pixel circuit are arranged in a unicursal manner, with which approximately an entirety of the display area is formed.

PRIOR ART DOCUMENT

Patent Document

Patent Document 1: JP-T-2005-528644
Patent Document 2: US Patent Application Publication No. 2008/0018583
Patent Document 3: Publication of Japanese Patent No. 5299730

SUMMARY OF THE INVENTION

Problem to be Solved by the Invention

In any case of the conventional configurations described above, the drivers have to be specially designed in accordance with the shape of the deformed panel. The configuration and control of the device, therefore, are complicated. Consequently, costs and time required for the manufacture of the products increase. Further, in a conventional rectangular shape panel as well, in a case where a part of lines on an active matrix substrate is cut, this influences the driving operation of the panel.

The present application discloses a configuration in which an abnormal operation that occurs in a case where lines on the active matrix substrate are cut can be suppressed.

Means to Solve the Problem

An active matrix substrate according to one embodiment of the present invention includes: a gate line group including a plurality of gate lines that extend in a first direction in a display area; a source line group including a plurality of source lines that extend in a second direction that is different from the first direction, in the display area; a pixel electrode that is arranged in the display area, and is connected to the gate line and the source line; and a gate line driving circuit that is formed in the display area, and controls a voltage level of the gate line according to a control signal supplied from outside of the display area. The gate line driving circuit includes: an accumulation line that accumulates a voltage for controlling the voltage level of the gate line; an output unit that controls the voltage level of the gate line according to the voltage of the accumulation line; an accumulated voltage supply unit that varies the voltage of the accumulation line according to a signal input from another gate line; and at least two accumulated voltage adjustment units that change the voltage of the accumulation line to a predetermined level according to the control signal. The output unit, the accumulated voltage supply unit, and the accumulated voltage adjustment unit are arranged along the gate line so as to be arrayed in the first direction, and the output unit is arranged at a position in the first direction that is interposed between the two accumulated voltage adjustment units.

Effect of the Invention

According to the disclosure of the present application, an abnormal operation that occurs in a case where lines on the active matrix substrate are cut can be suppressed.

BRIEF DESCRIPTION OF DRAWINGS

FIG. 2 is a top view illustrating a schematic configuration of an active matrix substrate 20a.

FIG. 3 is a top view illustrating a schematic configuration of the active matrix substrate 20a and respective parts connected with the active matrix substrate 20a.

FIG. 8A illustrates an example of cutting of the gate driver 11 illustrated in FIG. 5.

MODE FOR CARRYING OUT THE INVENTION

Figure 1:
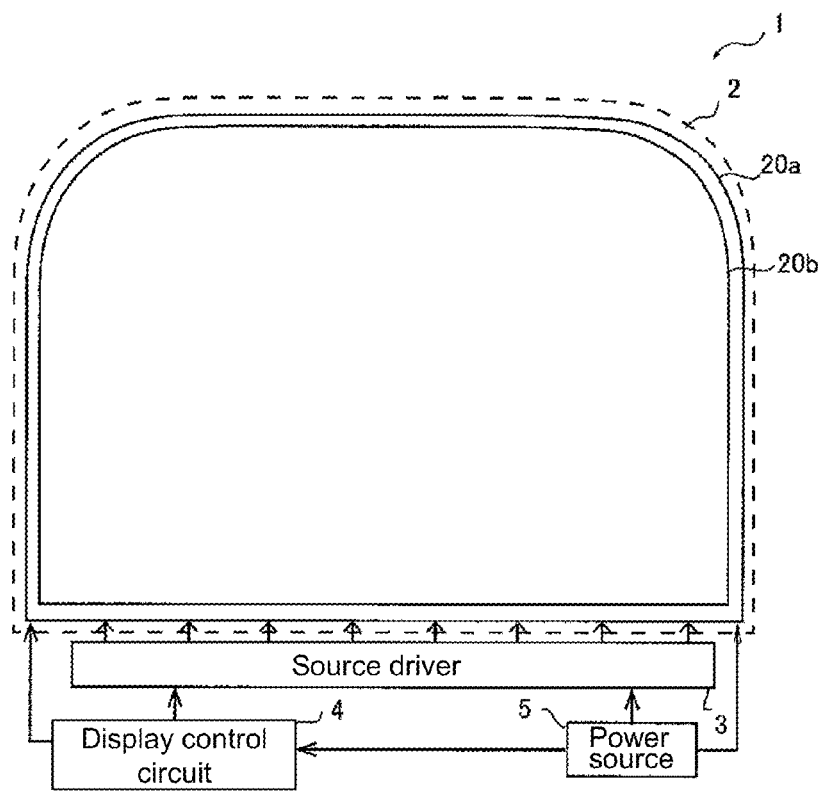
FIG. 1 is a top view illustrating a schematic configuration of a liquid crystal display device according to the present embodiment.

An active matrix substrate according to one embodiment of the present invention includes: a gate line group including a plurality of gate lines that extend in a first direction in a display area; a source line group including a plurality of source lines that extend in a second direction that is different from the first direction, in the display area; a pixel electrode that is arranged in the display area, and is connected to the gate line and the source line; and a gate line driving circuit that is formed in the display area, and controls a voltage level of the gate line according to a control signal supplied from outside of the display area. The gate line driving circuit includes: an accumulation line that accumulates a voltage for controlling the voltage level of the gate line; an output unit that controls the voltage level of the gate line according to the voltage of the accumulation line; an accumulated voltage supply unit that varies the voltage of the accumulation line according to a signal input from another gate line; and at least two accumulated voltage adjustment units that change the voltage of the accumulation line to a predetermined level according to the control signal. The output unit, the accumulated voltage supply unit, and the accumulated voltage adjustment unit are arranged along the gate line so as to be arrayed in the first direction, and the output unit is arranged at a position in the first direction that is interposed between the two accumulated voltage adjustment units.

In the above-described configuration, the gate line driving circuit is arranged in the display area. In other words, it is unnecessary to provide the gate line driving circuit outside the outer shape of the display area. With this, the degree of freedom in designing the outer shape of the display area increases. Further, the output unit, the accumulated voltage supply unit, and the accumulated voltage adjustment unit of the gate line driving circuit are arranged so as to be arrayed along the gate lines. The output unit is arranged to be interposed between two accumulated voltage adjustment units in the first direction. With this, even in a case where a part of the gate line driving circuit is cut, it is unlikely that an abnormal operation of the gate line driving circuit would occur. This makes it possible to suppress an abnormal operation due to cutting of a line on the active matrix substrate.

For example, even if one of the accumulated voltage adjustment units arranged so that the output unit is interposed therebetween is cut, the other accumulated voltage adjustment unit remains, which allows a normal operation to be performed. In a case where the output unit or the accumulated voltage supply unit is cut and the function thereof is damaged, either of the accumulated voltage adjustment units remains, which allows the gate line driving circuit to normally stop the operation. In this case, any false signal is not output from the gate line driving circuit to the gate line.

In the above-described active matrix substrate, the gate line driving circuit may include at least two of the accumulated voltage supply units. The output unit can be arranged at a position in the first direction that is interposed between the two accumulated voltage supply units. With this, even if one of the accumulated voltage adjustment units arranged so that the output unit is interposed therebetween is cut, the other accumulated voltage adjustment unit remains, which allows a normal operation to be continued. This therefore makes it possible to maintain a normal operation with respect to a greater variety of cut patterns.

The above-described active matrix substrate may have such a configuration that the accumulation line is formed along the gate line to extend in the first direction, and a plurality of the gate line driving circuits are connected to the accumulation line. With this, a plurality of gate line driving circuits can be arranged dispersedly in a direction in which the accumulation line extends. Even if a part of the accumulation line is cut, therefore, it is highly possible that a normal operation can be continued by some of a plurality of gate line driving circuits. Consequently, it is more unlikely that a malfunction of the gate line driving circuit due to cutting would occur.

The above-described active matrix substrate may further include: a control signal line that supplies the control signal to the gate line driving circuit; and a first terminal part that is provided on one side of a frame area that is arranged outside a driver arrangement area where the gate line driving circuit is arranged, and that is connected to the control signal line. This configuration can be such that the gate line driving circuit includes a switching element that is connected to the control signal line, and the switching element is connected, on a side thereof to the inside of the driver arrangement area, or on a side thereof to the first terminal part, with a line that branches from the control signal line and extends from inside of the driver arrangement area to outside.

In this configuration, in a case where a part on an outer side with respect to a cutting line that passes the driver arrangement area is cut off, it is likely that the switching element is cut away and the control signal line remains. Further, in a case where a part on an inner side with respect to the cutting line is cut off, since the output unit is interposed between the accumulated voltage adjustment units in the driver arrangement area, there is a high possibility that the output unit is cut off by the cutting. For this reason, it is unlikely that after the cutting, a malfunction of the switching element caused by a control signal would influence other lines. In other words, it is more unlikely that an abnormal operation due to cutting cut would occur.

An active matrix substrate according to an embodiment of the present invention includes: a gate line group including a plurality of gate lines that extend in a first direction in a display area; a source line group including a plurality of source lines that extend in a second direction that is different from the first direction, in the display area; a pixel electrode that is arranged in the display area, and is connected to the gate line and the source line; and a gate line driving circuit that is formed in the display area, and controls a voltage level of the gate line according to a control signal supplied from outside of the display area. The gate line driving circuit includes: an accumulation line that accumulates a voltage for controlling the voltage level of the gate line; an output unit that controls the voltage level of the gate line according to the voltage of the accumulation line; an accumulated voltage supply unit that varies the voltage of the accumulation line according to a signal input from another gate line; and an accumulated voltage adjustment unit that changes the voltage of the accumulation line to a predetermined level according to the control signal. The accumulated line is formed along the gate line to extend in the first direction, and a plurality of the gate line driving circuits are connected to the accumulation line. With this configuration as well, a plurality of gate line driving circuits can be arranged dispersedly in a direction in which the accumulation line extends. Consequently, it is more unlikely that a malfunction of the gate line driving circuit due to cutting would occur.

The above-described active matrix substrate can further include: a control signal line that supplies the control signal to the gate line driving circuit; a first terminal part that is provided on one side of a frame area that is arranged outside the display area, and that is connected to the control signal line; and a second terminal part that is provided on the same side as the first terminal part, and is connected to the source line group.

With the above-described configuration, the voltages of the respective gate lines can be controlled sequentially, according to control signals supplied from the first terminal part provided on one side of the frame area, by the gate line driving unit formed in the display area. Further, to each source line, data signals are supplied from a second terminal part provided on the same side as the first terminal part. Therefore, any line for connecting the gate line driving circuit and the gate line does not have to be formed along the frame area. Further, since data signals and control signals are supplied to the source lines and the gate line driving unit, respectively, from one side of the frame area, the frame can be narrowed on the other sides. Consequently, the degree of freedom in design such as the design of the active matrix substrate can be increased.

The above-described active matrix substrate can further include: a control signal line that supplies the control signal to the gate line driving circuit; and a first terminal part that is provided on one side of a frame area that is arranged outside the display area, and that is connected to the control signal line. In this case, the accumulation line connected to the gate line via the output unit is arranged between the gate line and a side where the first terminal is provided. With this, even if the accumulation line, the gate line, and the control signal line are cut along a cutting line that crosses these, it is unlikely that a false signal due to influences of the control signal line would flow from the accumulation line to the gate line. It is therefore more unlikely that an abnormal operation due to cutting would occur.

The configuration can be such that the output unit includes a switching element connected between the accumulation line and the gate line, and an electrode of the switching element and the accumulation line are connected in such a manner that one side of an outer shape of the electrode of the switching element is along a direction in which the accumulation line extends. In other words, the configuration can be such that the line connecting the switching element and the accumulation line does not include a branching. This makes it unlikely that such a situation would occur that the line connecting the switching element and the accumulation line is cut, and the terminal of the switching element has a floating potential. It is therefore more unlikely that an abnormal operation due to cutting would occur.

The above-described active matrix substrate can further include: a control signal line that supplies the control signal to the gate line driving circuit; and a first terminal part that is provided on one side of a frame area that is arranged outside the display area, and that is connected to the control signal line. In this case, the configuration can be such that the gate line driving circuit includes a switching element that is connected to the control signal line, and the switching element is connected, on a side thereof to the inside of the display area, or on a side thereof to the first terminal part, with a line that branches from a line extending in the second direction of the control signal line and extends from inside of the display area to outside.

In this configuration, in a case of cutting by a dividing line that passes the vicinities of the switching element, the state is either disconnection between the control signal line and the switching element, or disconnection between the switching element and something other than the control signal line. Therefore, in a part remaining in the inside of the display area after the cutting, it is unlikely that a malfunction of the switching element due to a control signal would influence another line. It is therefore more unlikely that an abnormal operation due to cutting would occur.

Among the gate lines in the gate line group, at least some of the gate lines are shorter than a maximum of a width of the display area in the first direction in which the gate lines extend. This makes it possible to realize a non-rectangular deformed panel.

An active matrix substrate according to one embodiment of the present invention includes: a gate line group including a plurality of gate lines that extend in a first direction in a display area; a source line group including a plurality of source lines that extend in a second direction that is different from the first direction, in the display area; a pixel electrode that is arranged in the display area, and is connected to the gate line and the source line; and a gate line driving circuit that is formed in the display area, and controls a voltage level of the gate line according to a control signal supplied from outside of the display area. The gate line driving circuit includes: an accumulation line that accumulates a voltage for controlling the voltage level of the gate line; an output circuit that includes a first switching element that is connected between the accumulation line and the gate line and switches the voltage level of the gate line according to the voltage of the accumulation line; an accumulated voltage supply circuit that includes a second switching element that is connected between the accumulation line and the gate line and varies the voltage of the accumulation line according to a signal input from another gate line; and at least two accumulated voltage adjustment circuits that include a third switching element that is connected between the control signal line for supplying the control signal and the accumulation line, and changes the voltage of the accumulation line to a predetermined level according to the control signal. The output circuit, the accumulated voltage supply circuit, and the accumulated voltage adjustment circuit are arranged along the gate line so as to be arrayed in the first direction, and the output circuit is arranged at a position in the first direction that is interposed between the two accumulated voltage adjustment circuits.

An active matrix substrate according to one embodiment of the present invention includes: the gate line group, the line group, the pixel electrode, and the gate line driving circuit. The gate line driving circuit includes: an accumulation line that accumulates a voltage for controlling the voltage level of the gate line; an output circuit that includes a first switching element that is connected between the accumulation line and the gate line and switches the voltage level of the gate line according to the voltage of the accumulation line; an accumulated voltage supply circuit that includes a second switching element that is connected between the accumulation line and another gate line and varies the voltage of the accumulation line according to a signal input from the another gate line; and an accumulated voltage adjustment circuit that includes a third switching element that is connected between the control signal line for supplying the control signal and the accumulation line, and changes the voltage of the accumulation line to a predetermined level according to the control signal. The output circuit, the accumulated voltage supply circuit, and the accumulated voltage adjustment circuit are arranged along the gate line so as to be arrayed in the first direction, and the output circuit is arranged at a position in the first direction that is interposed between the two accumulated voltage adjustment circuits. The accumulated line is formed along the gate line to extend in the first direction. A plurality of the gate line driving circuits are connected to the accumulation line.

In the above-described configuration, the gate line driving circuits are arranged in the display area. With this, the degree of freedom in designing the outer shape of the display area increases. Further, the output circuit, the accumulated voltage supply circuit, and the accumulated voltage adjustment circuit of the gate line driving circuit are arranged along the gate line. The output unit is arranged to be interposed between two accumulated voltage adjustment units in the first direction. With this, even in a case where a part of the gate line driving circuit is cut, it is unlikely that an abnormal operation of the gate line driving circuit would occur.

A display panel that includes the above-described active matrix substrate, a counter substrate, and a liquid crystal layer interposed between the above-described active matrix substrate and the counter substrate is encompassed by the embodiments of the present invention.

The following describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simplified or schematically illustrated, or some constituent members are omitted. Further, the dimension ratios of the constituent members illustrated in the drawings do not necessarily indicate the real dimension ratios.

<Embodiment 1>
(Configuration of Liquid Crystal Display Device)

FIG. 1 is a top view illustrating a schematic configuration of a liquid crystal display device according to the present embodiment. The liquid crystal display device 1 includes a display panel 2, a source driver 3, a display control circuit 4, and a power source 5. The display panel 2 includes an active matrix substrate 20a, a counter substrate 20b, and a liquid crystal layer (not illustrated) interposed between these substrates. Though illustration is omitted in FIG. 1, polarizing plates are provided on a lower surface of the active matrix substrate 20a, and on a top surface of the counter substrate 20b. On the counter substrate 20b, there are formed a black matrix, color filters of three colors of red (R), green (G), and blue (B), and a common electrode (all are not illustrated).

As illustrated in FIG. 1, in the display panel 2, upper end parts on left and right sides on the drawing sheet are formed in circular arc shapes. In other words, the outer shape of the display panel 2 as viewed in a vertical direction to the substrates is a non-rectangular shape. The active matrix substrate 20a of the display panel 2 is electrically connected with the source driver 3. The display control circuit 4 is electrically connected with the display panel 2, the source driver 3, and the power source 5. The display control circuit 4 outputs control signals to the source driver 3, and gate drivers formed on the active matrix substrate 20a (exemplary gate line driving circuits), which are to be described below. The control signals include a reset signal (CLR), clock signals (CKA, CKB), data signals and the like used for displaying images on the display panel 2. The power source 5 is electrically connected with the display panel 2, the source driver 3, and the display control circuit 4, and supplies a power source voltage signal to each of the same.

(Configuration of Active Matrix Substrate)

Figure 2:
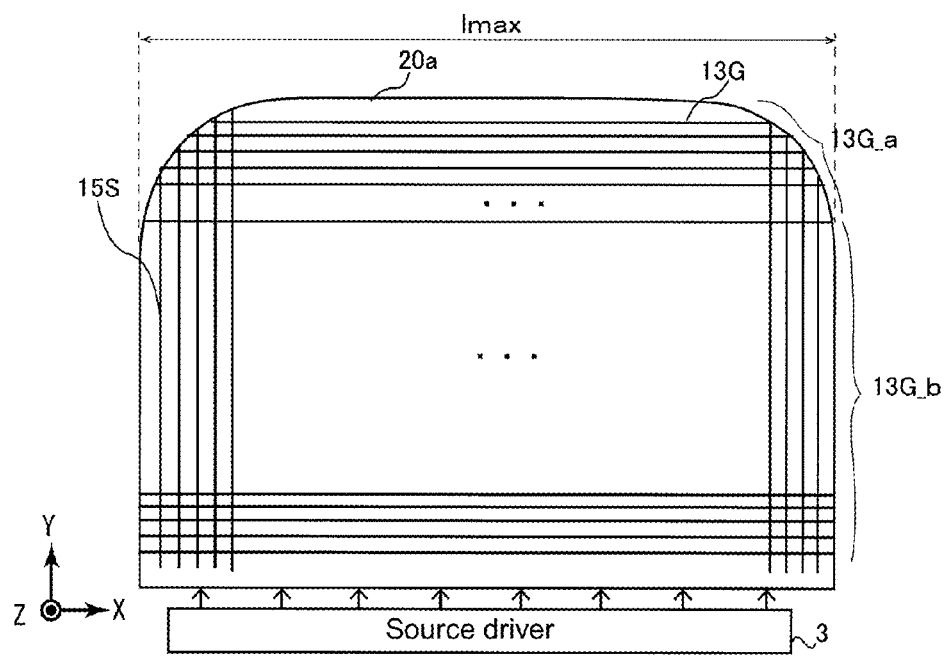

FIG. 2 is a top view illustrating a schematic configuration of the active matrix substrate 20a. As illustrated in FIG. 2, the upper ends on left and right sides of the active matrix substrate 20a are formed in circular arc shapes. In other words, the outer shape of the active matrix substrate 20a as viewed in a vertical direction to the substrate surface is a non-rectangular shape. In the active matrix substrate 20a, gate lines 13G are formed at uniform intervals in approximately parallel to one another from an end to the other end in the X axis direction. Among the gate lines 13G, the gate lines of the gate lines 13G_a formed in the circular arc shape part are shorter than the maximum length of the gate lines in the active matrix substrate 20a. Further, the maximum length of the gate lines can be set to be approximately equal to the maximum Imax of the width of the active matrix substrate 20a in the X-axis direction. For example, the gate lines 13G_b, which are the gate lines other than the gate lines 13G_a, can be set to be shorter than the maximum Imax, or approximately equal to the maximum Imax.

Further, as illustrated in FIG. 2, source lines 15S are formed to intersect with the gate lines 13G. The gate lines 13G are formed to extend in the row direction (horizontal direction), and the source lines 15S are formed to extend in the column direction (vertical direction). With this configuration, the gate lines 13G and the source lines 15S are arranged in a matrix form. An area surrounded by the gate line 13G and the source line 15S forms one pixel, and all of the areas of the pixels constitute a display area of the display panel 2. In other words, a region in which an image is displayed by the pixels is the display area. In each pixel, a pixel electrode connected to the gate line 13G and the source line 15S is provided.

Figure 3:
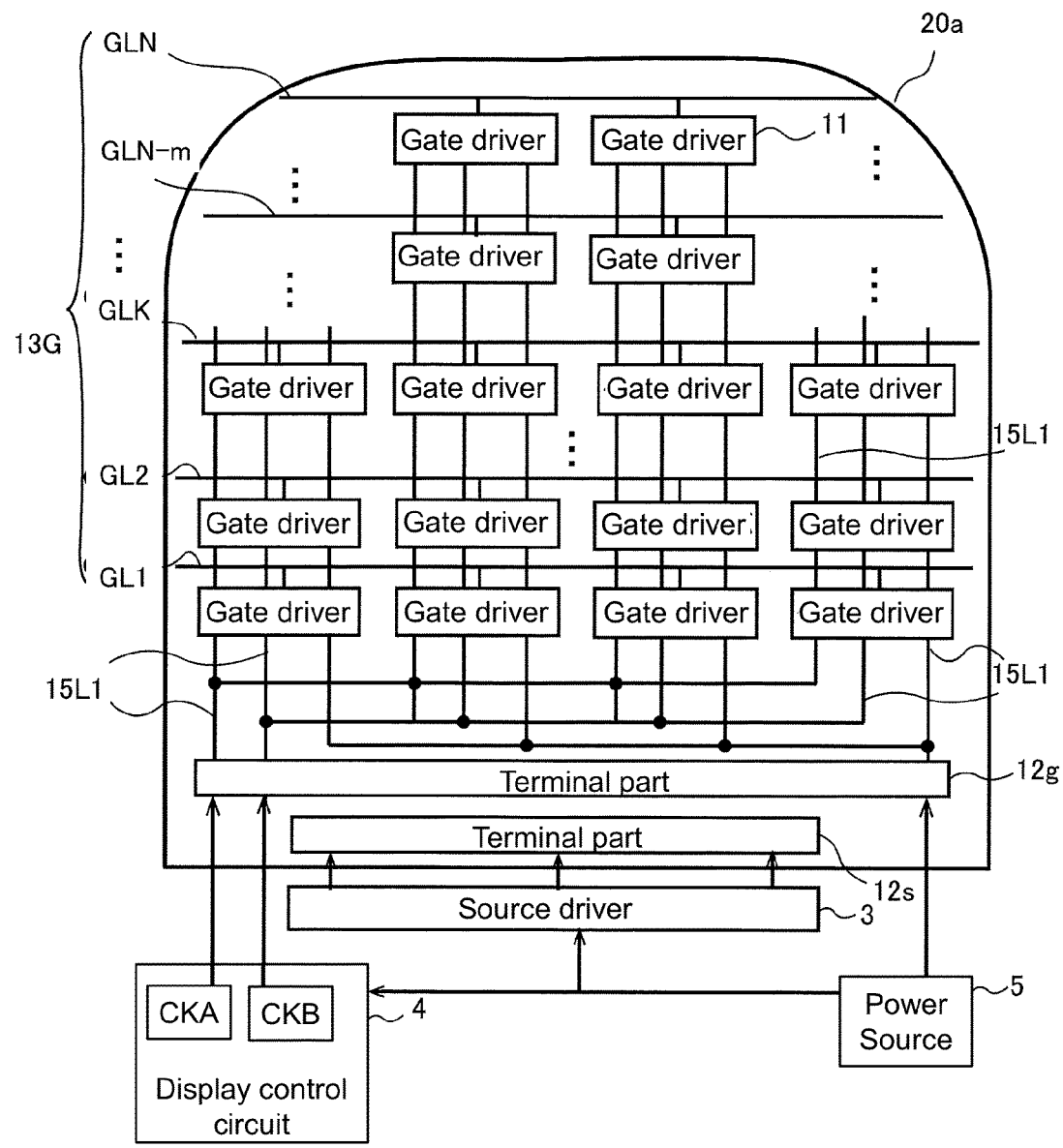

FIG. 3 is a top view illustrating a schematic configuration of the active matrix substrate 20a in which the illustration of the source lines 15S is omitted, and respective parts connected with the active matrix substrate 20a. As illustrated in the example of FIG. 3, in spaces between the gate lines 13G, that is, in the display area, gate drivers 11 are formed. The gate driver 11 is an exemplary gate line driving circuit that controls the voltage level of the gate line 13G according to a control signal supplied from outside the display area. In this example, four gate drivers 11 are connected to each of the gate lines GL1, GL2, . . . , GLK among the gate lines 13G, and two gate drivers 11 are connected to each of the gate lines GLN-m to GLN among the gate lines 13G.

In the display area of the active matrix substrate 20a, in a frame area on a side where the source driver 3 is provided, a terminal part 12g (one example of a first terminal part) is formed. The terminal part 12g is connected with the control circuit 4 and the power source 5. The terminal part 12g receives controls signals output from the control circuit 4 and the power source 5. The control signals include, for example, clock signals (CKA, CKB), a reset signal, and a power source voltage signal. The control signals such as the clock signals (CKA, CKB) and the power source voltage signal, input to the terminal part 12g, are supplied to each gate driver 11 through the lines 15L1. The gate drivers 11, in accordance with the control signals supplied thereto, output selection signals indicating a selection state or a non-selection state, to the gate lines 13G connected thereto.

Further, the gate drivers 11 connected to the gate lines 13G on each stage are connected to the gate lines 13G on the previous stage. This allows the gate drivers 11 on each stage to receive a selection signal from the gate lines 13G on the previous stage as a set signal. In other words, the gate drivers 11 of each stage can output a selection signal to the gate line connected thereto, and can output a set signal to the gate line 13G on the next stage. In the following description, an operation of outputting a selection signal to one gate line 13G is called "driving of the gate line 13G in some cases.

Further, in the active matrix substrate 20a, in the frame area on the side where the source driver 3 is provided, a terminal part 12s (second terminal part) that connects the source driver 3 and each source line 15S with each other is formed. The source driver 3 outputs a data signal to each source line 15S (see FIG. 2), according to the control signals input from the display control circuit 4.

As illustrated in FIG. 3, in the present embodiment, a plurality of the gate drivers 11 are connected to each of the gate lines 13G denoted by GL1 to GLN in the display area. The gate drivers 11 connected to the identical gate line 13G are in synchronization, and one gate line 13G is simultaneously driven by these gate drivers 11. In the present embodiment, a plurality of the gate drivers 11 are connected at approximately equal intervals to one gate line 13G, in such a manner that loads on the gate drivers 11 for driving the gate line 13G should be approximately equal.

(Configuration of Gate Driver 11)

Figure 4:
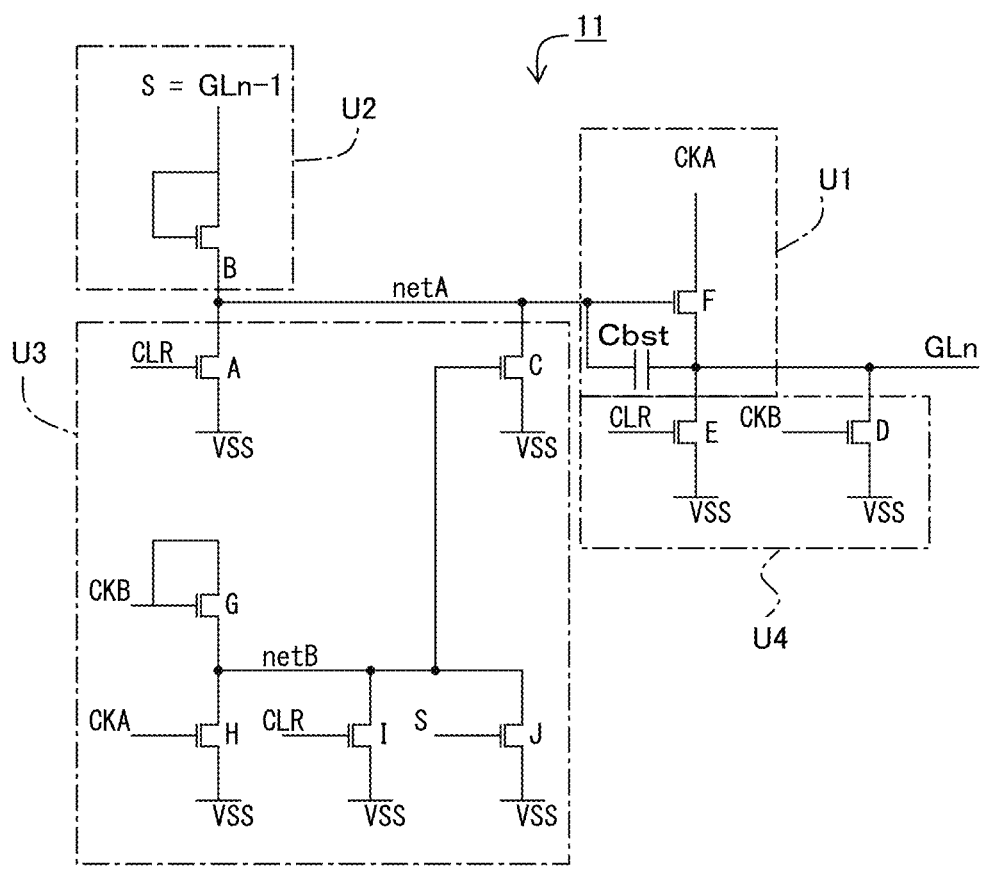
FIG. 4 illustrates an exemplary equivalent circuit of a gate driver 11.

Here, the configuration of the gate driver 11 according to the present embodiment is described. FIG. 4 illustrates an exemplary equivalent circuit of the gate driver 11 that is arranged between the gate lines 13G of GLn-1 and GL, and drives the gate line 13G of GLn. As illustrated in FIG. 4, the gate driver 11 includes TFTs-A to -J formed with thin film transistors (TFTs) as switching elements, a capacitor Cbst, and lines netA, netB. Here, the netA is one example of an accumulation line for accumulating the voltage to be applied to the gate line 13G. The gate driver 11 includes an output unit U1, a netA pullup unit U2, a netA pulldown unit U3, and a GL pulldown unit U4, as circuit blocks.

The output unit U1 controls the voltage level of the gate line GLn according to the voltage of the netA, which is one example of the accumulation line. The output unit U1 includes a TFT-F (one example of a first switching element) connected between the netA and the gate line GLn. Further, in the present example, the output unit U1 includes the capacitor Cbst connected between the gate line GLn and the netA. With the capacitor Cbst and the TFT-F, a voltage for controlling the voltage level of the gate line GLn can be accumulated in the netA. The TFT-F controls the voltage level of the gate line GLn according to the voltage accumulated in the netA. The output unit U1, therefore, can be regarded as the last buffer for charging a voltage signal to be applied to the gate line GLn. Further, the output unit U1 can be regarded as an output circuit that includes a switching element and a capacitor connected between the gate line GLn and the netA. In the example illustrated in FIG. 4, the gate of the TFT-F is connected to the netA, the drain thereof is connected to a control signal line that supplies the clock signal CKA, and the source thereof is connected to the gate line GLn.

The netA pullup unit U2 is one example of an accumulated voltage supply unit that varies the voltage of the accumulation line according to a signal that is input from another gate line. The netA pullup unit U2 is connected between the netA and the gate line GLn−1 on the previous stage, and includes a TFT-B (one example of a second switching element) that varies a voltage of the netA according to a signal input from the gate line GLn−1 on the previous stage. In the present example, the gate and the drain of the TFT-B are connected with the gate line GLn−1 on the previous stage (diode connection), the source of the TFT-B is connected to the netA. This allows the netA pullup unit U2 to, at a timing when receiving the selection signal of the gate line GLn−1 on the previous stage, charge a voltage to be applied to the gate line GL in the netA. In this way, the netA pullup unit U2 can be regarded as a charging circuit that accumulates, in the netA, a voltage for applying a voltage at a level for the selection state (in the present example, at a high level) to the gate line GLn.

The netA pulldown unit U3 is one example of an accumulated voltage adjustment unit that adjusts the voltage of the netA to a predetermined level according to the control signals. The netA pulldown unit U3 includes a TFT-A, a TFT-C, a TFT-G, a TFT-H, a TFT-I, and a TFT-J (examples of the third switching element) that are connected between the control signal lines for supplying control signals such as the signals CKA, CKB, VSS and the netA, and adjust the voltage of the accumulation line to a predetermined level according to the control signals.

In the example illustrated in FIG. 4, the netA pulldown unit U3 is a circuit that controls the voltage of the netA in order to return the voltage of the gate line GLn from the level for the selection state to the level for the non-selection state at an appropriate timing. For this purpose, the netA pulldown unit U3 includes the TFT-C connected between the netA and the control signal line for supplying a power source voltage signal VSS at a predetermined level (low level), and the TFTs-G, H, I, J for generating a signal for controlling the turning ON/OFF of the TFT-C based on the clock signals CKA, CKB and the set signal from the gate line GLn−1 of the previous stage. Further, the TFT-A, which is connected between the control signal line for supplying the power source voltage signal VSS and the netA, and supplies the power source voltage signal VSS to the netA according to the reset signal of the control signal line, is also included in the netA pulldown unit U3.

More specifically, the gate of the TFT-C is connected to the line netB. The source of the TFT-G is connected to the netB, and the gate and the drain of the same are connected to the control signal line for supplying the clock signal CKB (diode connection). The drain of the TFT-H is connected to the netB, the gate thereof is connected to the control signal line for the clock signal CKA, and the source thereof is connected to the control signal line for the power source voltage signal VSS. The drain of the TFT-I is connected to the netB, the gate thereof is connected to the control signal line for supplying the reset signal CLR, and the source thereof is connected to the control signal line for the power source voltage signal VSS. The drain of the TFT-J is connected to the netB, the gate thereof is connected to GLn−1 on the previous stage, and the source thereof is connected to the control signal line for the power source voltage signal VSS.

The GL pulldown unit U4 is a circuit that adjusts the voltage of the gate line GLn to a predetermined level according to control signals. In the present example, the GL pulldown unit U4 adjusts the voltage of the gate line GLn to a level for the non-selection state based on the control signals. For this purpose, the GL pulldown unit U4 includes the TFT-E and the TFT-D, which are provided between the gate line GLn and the control signal line for the power source voltage signal VSS at the predetermined level (low level).

The drain of the TFT-E is connected to the gate line GLn, the gate thereof is connected to the control signal line of the reset signal CLR, the source thereof is connected to the control signal line of the power source voltage signal VSS. The drain of the TFT-D is connected to the gate line GLn, the gate thereof is connected to the control signal line for the clock signal CKB, and the source thereof is connected to the control signal line for the power source voltage signal VSS.

In the drawing of FIG. 4, an equivalent circuit of one netA pulldown unit U3 is illustrated, but in the gate driver 11 in the present embodiment, at least two circuits constituting the netA pulldown units U3 illustrated in FIG. 4 are connected to the netA. In other words, in one gate driver 11, two netA pulldown units U3 are included.

In the present embodiment, the phase of the clock signal CKA and the phase of the clock signal CKB are opposite to each other. The phase of the clock signal for the gate driver 11 of the gate line of each stage, and the phase of the clock signal for the gate driver 11 of the gate line of the adjacent stage are opposite to each other, too. Therefore, for example, the gate driver 11 of the gate line of the gate line GLn+1 has such a configuration that CKA and CKB are replaced with each other in the configuration illustrated in FIG. 4. More specifically, in the gate driver of the gate line GLn, the clock signals supplied to the TFT-D, the TFT-F, the TFT-H, and the TFT-G are arranged so as to have phases opposite to those of the clock signals supplied to the TFTs of the gate driver of the adjacent gate line GLn+1, respectively.

The reset signal CLR, for example, can be kept at a H level for a predetermined certain period before the start of scanning of the gate lines. In this case, the reset signal CLR rises to the H level every vertical period. The rise of the reset signal CLR to the H level causes the netA and the gate line GL to be reset to the L level (the level of the power source voltage signal VSS). Further, at the start of one vertical period, to the gate line GL1 on the first stage, a gate start pulse (GSP) is input as a signal S.

(Exemplary Arrangement in Display Area)

Figure 5:
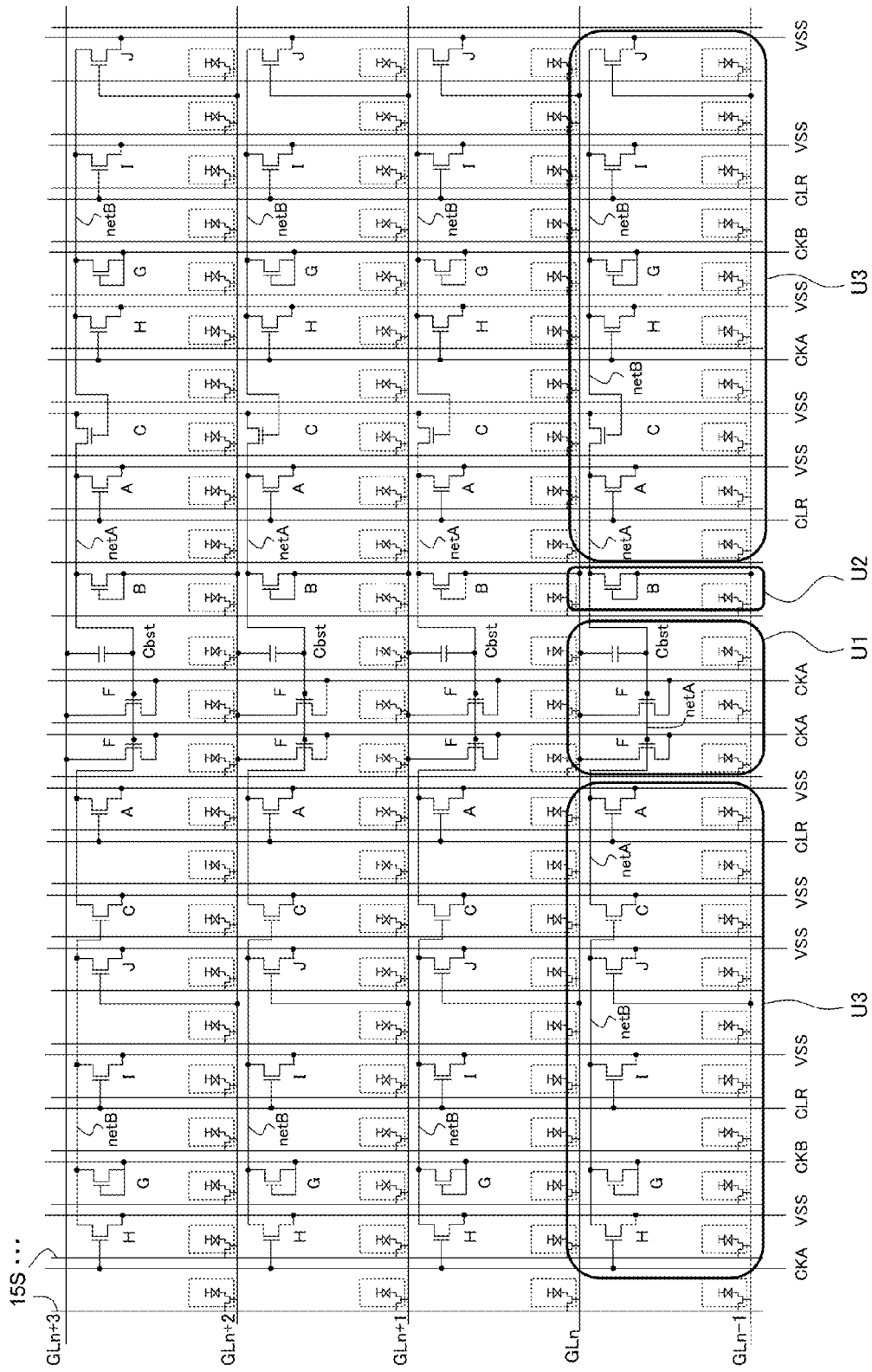
FIG. 5 illustrates an exemplary circuit configuration in a case where the gate driver 11 illustrated in FIG. 4 is arranged in a display area.

FIG. 5 illustrates an exemplary circuit configuration in a case where the gate driver 11 illustrated in FIG. 4 is arranged in the display area. In the example illustrated in FIG. 5, the control signal lines for supplying the control signals (VSS, CLR, CKA, CKB) are arranged in parallel to the source lines 15S. The netA and the netB are formed to extend in the same direction as the gate lines GL. The TFTs-A to J and the capacitor Cbst included in one gate driver 11 are arranged along one gate line GL. In the present example, the TFTs-A to J and the capacitor Cbst of the gate driver 11 are dispersedly arranged at positions that overlap one row of pixels arrayed along the gate line GL.

In the example illustrated in FIG. 5, the netA pulldown unit U3, the output unit U1, the netA pullup unit U2, and the netA pulldown unit U3 are arranged in the stated order along the gate line GLn. One gate driver 11 includes at least the two netA pulldown units U3, the output unit U1, and the netA pullup unit U2. Between the two netA pulldown units U3, the output unit U1 and the netA pullup unit U2 are arranged. More specifically, the output unit U1 is interposed between the netA pulldown units U3 in the direction in which the gate line GLn extends.

In the example illustrated in FIG. 5, a plurality of the TFTs-F, which are arranged with respect to a plurality of pixels, respectively, are included in the output unit U1. The number of the TFTs-F, however, is not limited to the number of the same illustrated in the example of FIG. 5. At each of the pixels on both sides of the pixel array at which the output unit U1 is formed, the netA connected to the TFTs-F is formed to extend from the output unit U1. At the pixel on the right of the pixel for the output unit U1, the TFT-B of the netA pullup unit U2 is arranged to be connected to the netA.

At the pixel on the right of this pixel for the netA pullup unit U2, the netA is formed to further extend. At the pixels on the right of the pixel for the netA pullup unit U2, the TFT-A and the TFT-C of the netA pulldown unit U3 connected to the netA are arranged. To the TFT-C, the netB is connected, and this netB is connected the TFT-H, the TFT-G, the TFT-I, and the TFT-J of the netA pulldown unit U3 arranged at pixels on the further right.

At the pixels on the left of the pixels for the output unit U1, the TFT-A and the TFT-C of the netA pulldown unit U3 are connected to the netA that extends from the output unit U1. To this TFT-C, the netB is connected, and this netB is connected to the TFT-H, the TFT-G, the TFT-I, and the TFT-J of the netA pulldown unit U3 arranged at pixels on the further left side.

(Operation Example)

Figure 6:
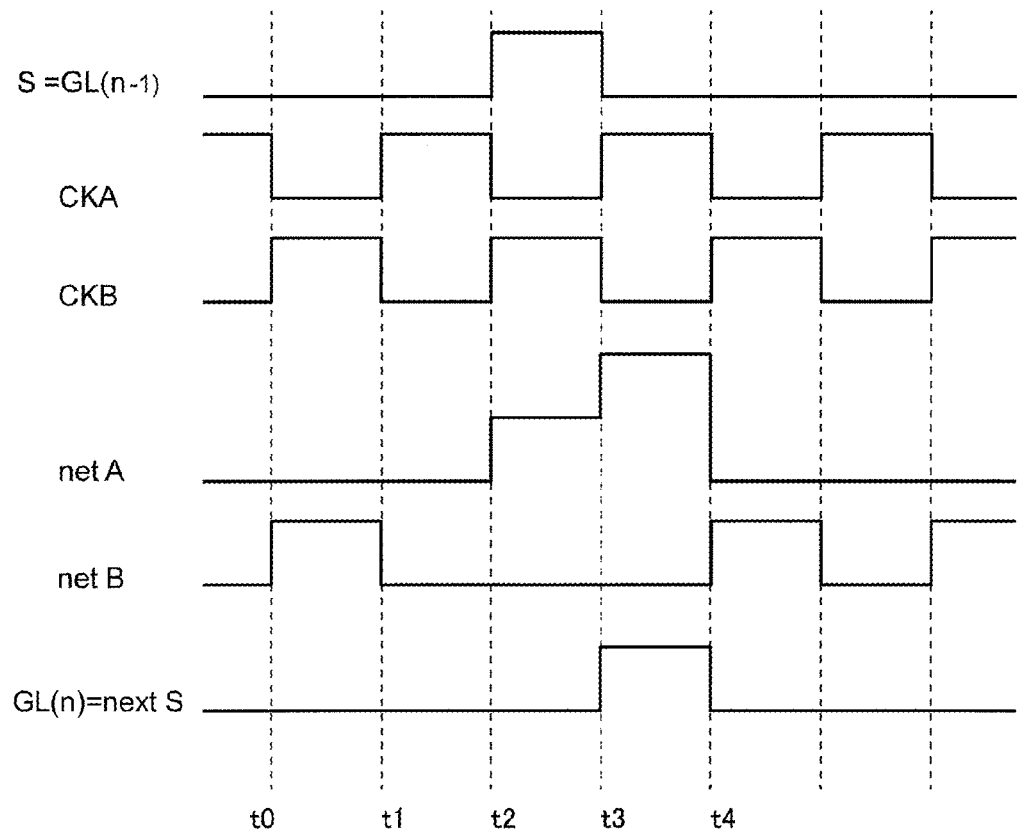
FIG. 6 is a timing chart illustrating an exemplary signal waveform of the gate driver 11 illustrated in FIGS. 4 and 5 during operation.

FIG. 6 is a timing chart illustrating an exemplary signal waveform of the gate driver 11 illustrated in FIGS. 4 and 5 during operation. In the description below, the low level as a signal level is referred to as a L level, and the high level is referred to as a H level. From a time t0 to a time t1 in FIG. 6, the clock signal (CKA) at the L level is input to the gate of the TFT-H and the drain of the TFT-F, and the clock signal (CKB) at the H level is input to the gate of the TFT-G and the gate of the TFT-D. With this, the TFT-G is turned ON and the TFT-H is turned OFF, whereby the netB is charged to the H level. Further, the TFT-C and the TFT-D are turned ON, and the TFT-F is turned OFF, whereby the netA is charged to the power source voltage (VSS) at the L level, which causes a potential at the L level to be output to the gate line GLn.

Next, at a time t1, the clock signal (CKA) rises to the H level and the clock signal (CKB) falls to the L level, which causes the TFT-G to be turned OFF and the TFT-H to be turned ON, whereby the netB is charged to the L level. Since the TFT-C and the TFT-D are turned OFF, the potential of the netA is maintained at the L level, which causes the gate line GLn to maintain the potential at the L level.

At a time t2, the clock signal (CKA) falls to the L level and the clock signal (CKB) rises to the H level, which causes the set signal S to be input to the gate and drain of the TFT-B via the gate line GLn−1 on the previous stage. With this, the TFT-B is turned ON and the netA is charged to the H level. Further, since the TFT-J is turned ON, the TFT-G is turned ON, and the TFT-H is turned OFF, the netB is in a state of being maintained at the L level. Since the TFT-C and the TFT-F are turned OFF, the potential of the netA does not fall and is maintained. During this period, the TFT-D is turned ON, and the potential of the gate line GLn is at the L level.

At a time t3, the clock signal (CKA) rises to the H level and the clock signal (CKB) falls to the L level, which causes the TFT-F to be turned ON, and the TFT-D to be turned OFF. Since the capacitor Cbst is provided between the netA and the gate line GLn, the netA is charged to a potential higher than the H level of the clock signal (CKA), along with the rise of the potential of the drain of the TFT-F. During this period, since the TFT-G and the TFT-J are turned OFF and the TFT-H is turned ON, the potential of the netB is maintained at the L level. Since the TFT-C is in the OFF state, the potential of the netA does not fall, and the potential at the H level of the clock signal (CKA) is output to the gate line GLn. This causes the gate line GLn to become in a selected state, and the set signal S to be output to the gate driver 11 of the gate line GLn+1 on the next stage.

At a time t4, the clock signal (CKA) falls to the L level and the clock signal (CKB) rises to the H level, which causes the TFT-G to be turned ON and the TFT-H to be turned OFF, whereby the netB is charged to the H level. This causes the TFT-C to be turned ON and the netA is charged to the L level. During this period, since the TFT-D is turned ON and the TFT-F is turned OFF, the potential at the L level is output to the gate line GLn, and the gate line GLn is charged to the L level. The gate line GLn returns to the non-selected state.

The liquid crystal display device 1 sequentially scans the gate lines 13G by using a plurality of the gate drivers 11 connected to each gate line 13G, and supplies data signals to each source line 15S by using the source driver 3, thereby causing an image to be displayed on the display panel 2. In the present embodiment, in the display area, a plurality of gate drivers 11 for driving one gate line 13G are formed in a space between the gate lines 13G. Even in a case where the lengths of the gate lines 13G are determined according to the width of the outer shape of the display panel 2, the gate lines 13G are sequentially selected one by one according to the set signal output from the gate drivers 11 in the display area.

Further, the control signals such as the clock signals, the power source voltage signal, and the like supplied to each gate driver 11 are input from one side of the display panel 2, which is the side where the source driver 3 is provided. This makes it possible to narrow the frame areas on the three sides where the source driver 3 is not provided. Thus, the design of the outer shape of the display panel 2 is not limited by the arrangement of the gate drivers 11, whereby the degree of freedom in design can be increased.

(Effect of Circuit Block Arrangement of Gate Drivers)

Figure 7:
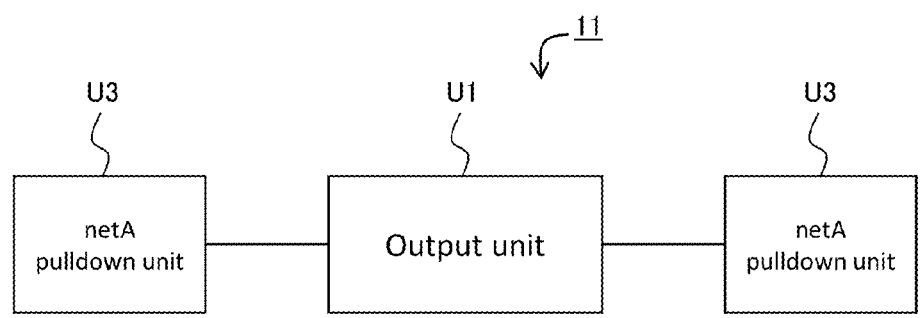
FIG. 7 illustrates the positional relationship of an output unit U1 and a netA pulldown unit U3 arranged in the gate driver 11.
Figure 8B:
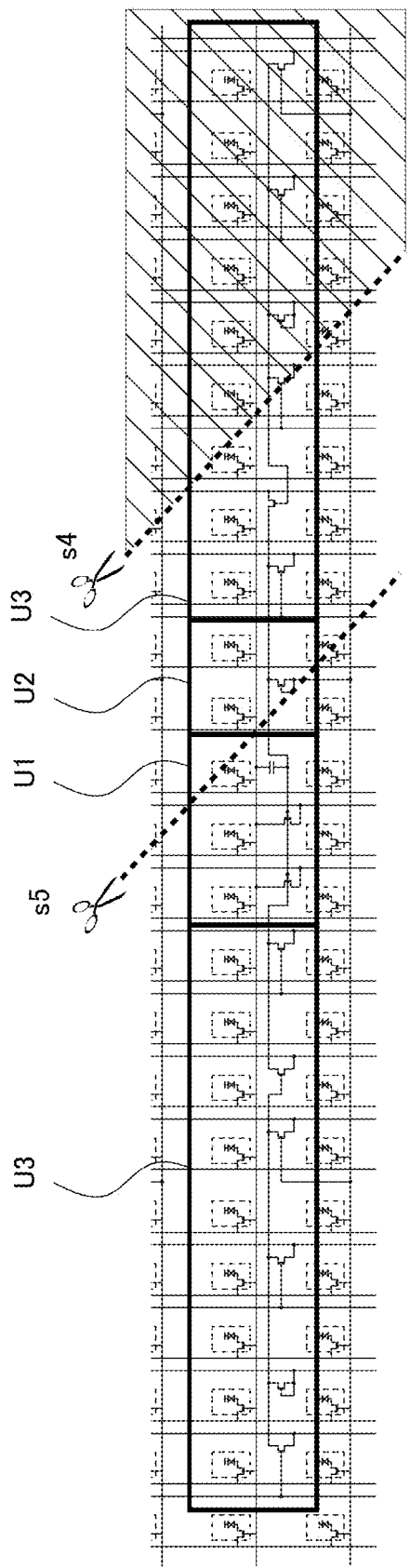
FIG. 8B illustrates an example of cutting of the gate driver 11 illustrated in FIG. 5.

In the present embodiment, as illustrated in FIGS. 5 and 7, in the gate driver 11, the output unit U1 is arranged so as to be interposed between the netA pulldown units U3. This makes it unlikely that an abnormal operation of the drivers would occur when a part of the gate driver 11 is cut. This effect is described below, with reference to specific examples. FIGS. 8A and 8B illustrated an example of cutting of the gate driver 11 illustrated in FIG. 5.

First of all, the following description describes a case where, along a cutting line s1 in FIG. 8A, a part of the netA pulldown circuit U3 is cut, and the left side part to the cutting line s1 is cut away, so that the right side part remains. In this case, even if the function of the netA pulldown circuit U3 on the left of the output unit U1 is damaged, the netA pulldown circuit U3 on the right of the output unit U1 remains. After the division along s1 as well, therefore, the gate driver 11 still normally operates.

In a case of cutting along a cutting line s2 that crosses the output unit U1, some of the TFTs-F included in the output unit U1 are cut away, and the other TFTs-F and the capacitor Cbst remain. In this case, a circuit that functions as the last buffer remains, which allows the normal operation to be continued. In a case of cutting along a cutting line s3, all of the TFTs-F and the capacitors Cbst are cut away, which causes the function of the last buffer to stop. As a result, the input of a signal to the gate line GLn is stopped, and the gate driver 11 normally stops the operation. In this way, in the configuration illustrated in FIG. 8A, in a case where the cutting line is shifted from left to right, the gate driver 11 remains performing a normal operation until the function of the output unit U1 stops, and when the function of the output unit U1 stops, the operation can be stopped normally.

In a case where a part of the netA pulldown unit U3 on the right of the output unit U1 with respect to a cutting line s4 in FIG. 8B is removed, the netA pulldown unit U3 on the left of the output unit U1 remains. The gate driver 11, therefore, continues the normal operation. In a case of cutting between the output unit U1 and the netA pullup unit U2 along a cutting line s5, the output of the gate driver 11 normally stops. In this case, the gate driver 11 does not influences another gate driver 11 arranged in parallel with the same. In this way, in the case where the cutting line is shifted from right to left, the gate driver 11 also continues a normal operation until the function of the netA pullup unit U2 is damaged, and when the operation of the netA pullup unit U2 stops, the gate driver 11 normally stops.

In the gate driver 11, by connecting the circuits of the netA pullup units to the circuit of the output unit U1 on both sides as illustrated in FIG. 7, a configuration that is capable of withstanding cutting can be realized. For example, such a configuration can be realized that, if a part of the gate driver 11 is removed on the left side, or if a part of the gate driver 11 is removed on the right side, an abnormal operation of the gate driver 11 does not occur. This makes it possible to form the gate driver 11 including the configuration illustrated in FIG. 7 on the active matrix substrate in a rectangular shape, and thereafter cut off ends of the active matrix substrate so as to change the active matrix substrate into a desired shape. For example, the non-rectangular display panel as illustrated in FIG. 2 can be manufactured by cutting a rectangular-shape panel. It is therefore possible to manufacture a non-rectangular active matrix substrate by using the same setting and facility as those used in a case where a rectangular-shape active matrix substrate is manufactured. Moreover, it is possible to reduce costs and time required when a non-rectangular display panel is manufactured.

The above-described effect can be also achieved in a case where another circuit, for example, the netA pullup unit U2 or the GL pulldown unit U4 is arranged between the output unit U1 and the netA pulldown unit U3 in the configuration illustrated in FIG. 7.

Figure 9A:
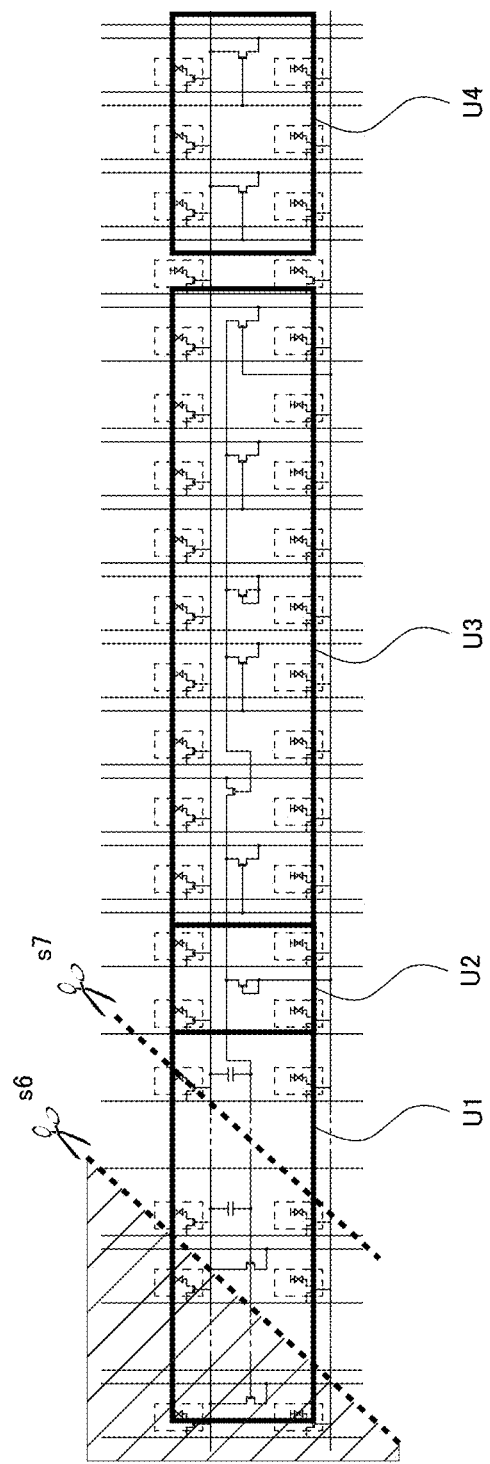
FIG. 9A illustrates an example of cutting of a gate driver that does not include the configurations illustrated in FIG. 7.
Figure 9B:
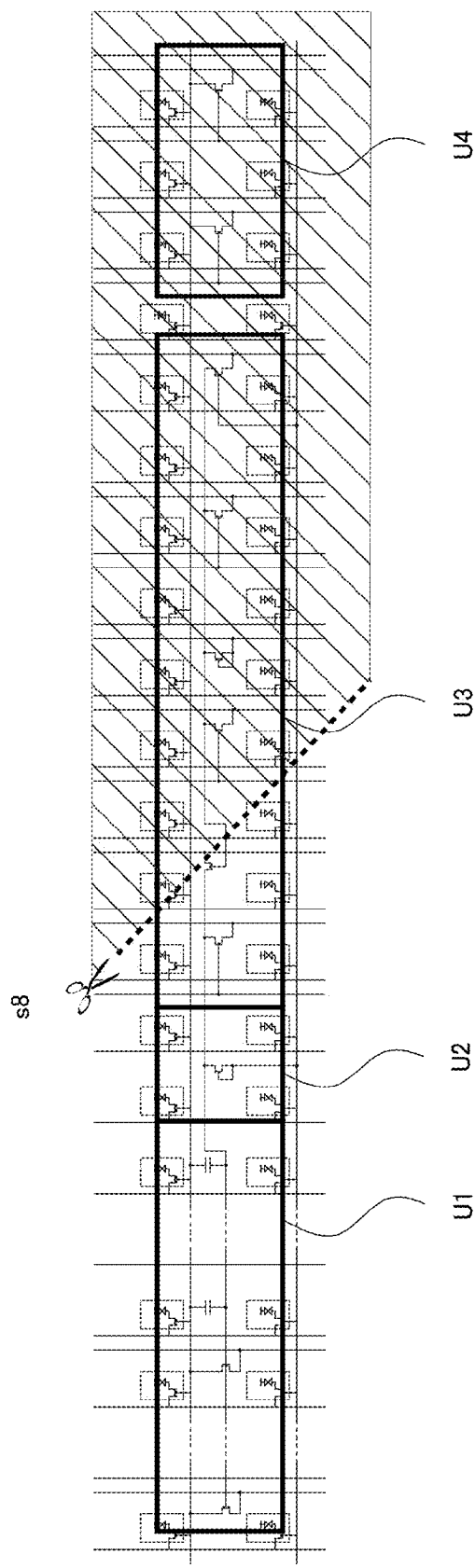
FIG. 9B illustrates an example of cutting of a gate driver that does not include the configurations illustrated in FIG. 7.

FIGS. 9A and 9B illustrates examples of cutting of a gate driver that does not include the configurations illustrated in FIG. 7. In FIGS. 9A and 9B, the output unit U1, the netA pullup unit U2, the netA pulldown unit U3, and the GL pulldown unit U4 are arranged in this order from right. As illustrated in FIG. 9A, in a case where some of the TFTs-F of the output unit U1 are cut away along the cutting line s6, the gate driver continues a normal operation. In a case where all of the TFTs-F that function as the last buffer of the output unit U1 is cut away along the cutting line s7 shifted further inward, the gate driver normally stops the operation.

In a case where, as illustrated FIG. 9B, the function of the netA pulldown unit U3 is damaged by cutting along the cutting line s8 that crosses the netA pulldown unit U3, the following problem possibly occurs: the potential of the gate of the TFT-F of the last buffer of the output unit U1 does not fall, which causes the clock signal to be leaked to the gate line, thereby to cause an abnormal operation. In this way, in a case where the configuration illustrated in FIG. 7 is not included, an abnormal operation of a gate driver tends to be caused by cutting.

Figure 10A:
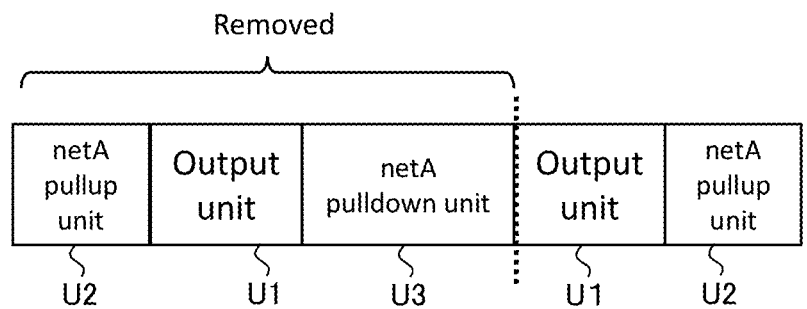
FIG. 10A illustrates another example of cutting of a gate driver that does not include the configurations illustrated in FIG. 7.
Figure 10B:
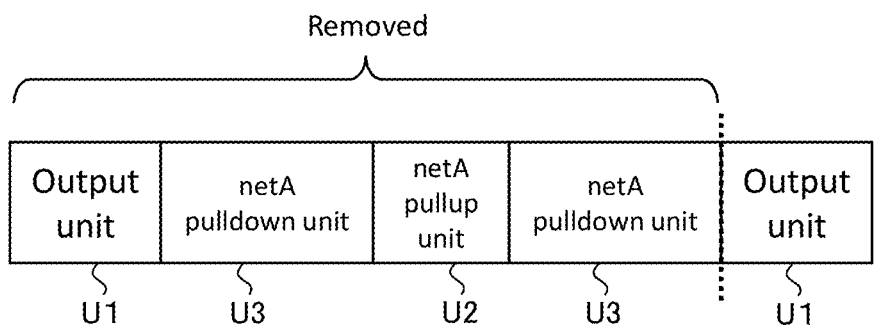
FIG. 10B illustrates still another example of cutting of a gate driver that does not include the configurations illustrated in FIG. 7.
Figure 10C:
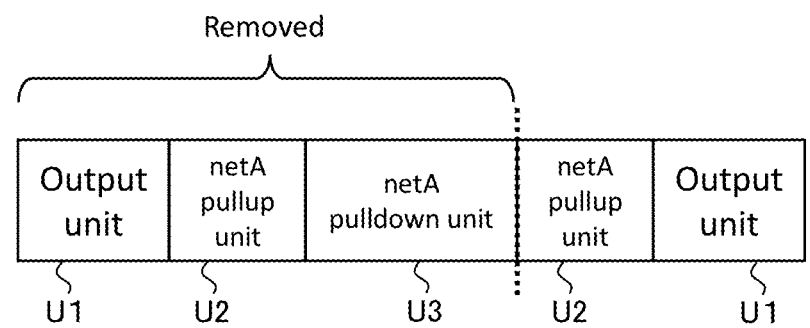
FIG. 10C illustrates still another example of cutting of a gate driver that does not include the configurations illustrated in FIG. 7.

FIGS. 10A, 10B, and 10C illustrate other examples of cutting of a gate driver that does not include the configurations illustrated in FIG. 7. In a case where a gate driver in such a configuration that a netA pulldown unit is located on an inner side with respect to an output unit is divided as illustrated in FIGS. 10A to 10C, the possibility that the driver performs an abnormal operation is high.

In the example illustrated in FIG. 10A, the netA pullup unit U2, the output unit U1, the netA pulldown unit U3, the output unit U1, and, the netA pullup unit U2 are arrayed in the stated order. If the netA pullup unit U2 on the left, the output unit U1, and the netA pulldown unit U3 among these are cut away, the potential of the netA remains at the H level, which highly possibly causes a malfunction.

In the example illustrated in FIG. 10B, the output unit U1, the netA pulldown unit U3, the netA pullup unit U2, the netA pulldown unit U3, and the output unit U1 are arrayed in the stated order. If the output unit U1 on the left, the netA pulldown unit U3, the netA pullup unit U2, and the netA pulldown unit U3 among these are cut away, the netA has a potential at the H level due to capacitive coupling of the netA with other signals, which highly possibly causes a malfunction.

In the example illustrated in FIG. 10C, the output unit U1, the netA pullup unit U2, the netA pulldown unit U3, the netA pullup unit U2, and the output unit U1 are arranged in the stated order. If the output unit U1 and the netA pullup unit U2 on the left, as well as the netA pulldown unit U3 among these are cut away, the potential of the netA remains at the H level, which highly possibly causes a malfunction.

Figure 11:
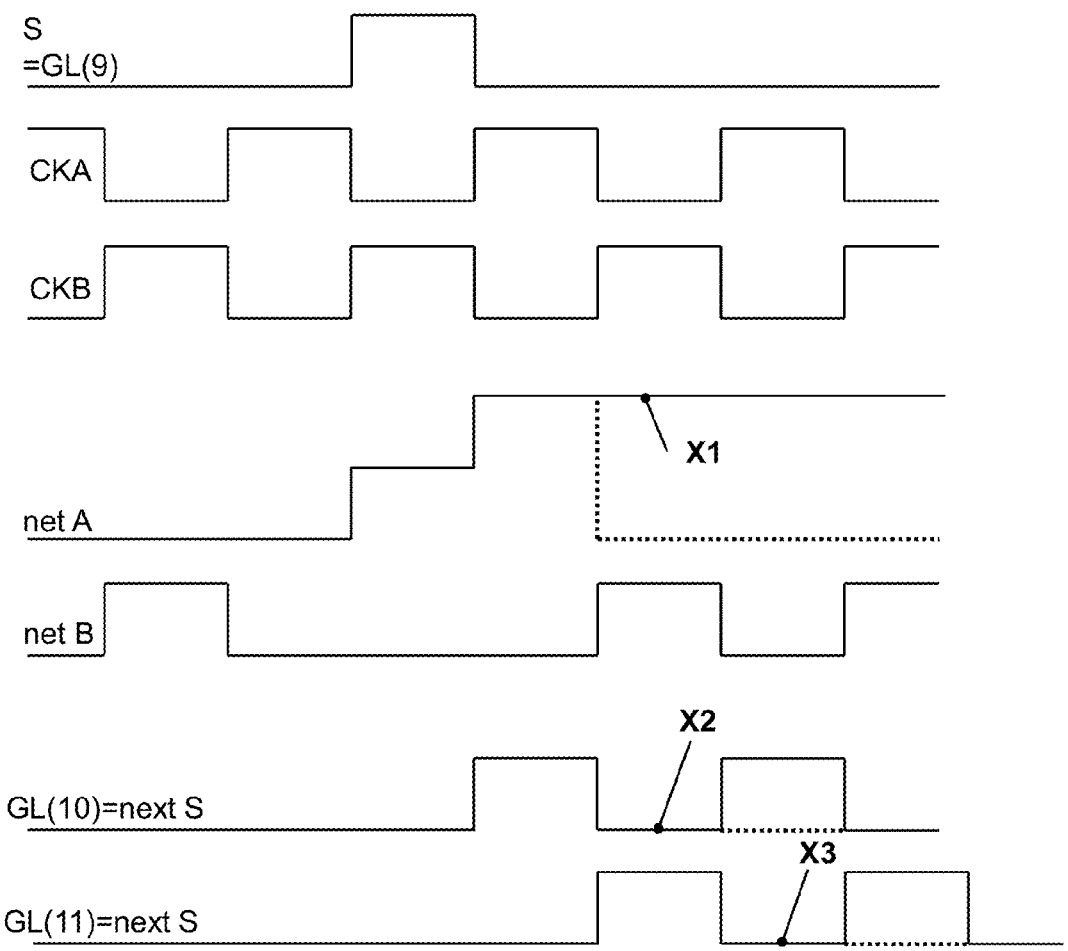
FIG. 11 is a timing chart illustrating an exemplary case where a malfunction occurs to the gate driver 11 due to cutting.

FIG. 11 is a timing chart illustrating an exemplary case where a malfunction occurs to the gate driver 11 due to cutting. FIG. 11 illustrates an exemplary operation in a case where the circuit configuration illustrated in FIG. 4 is cut at a position between the netB and the gate of the TFT-C. In FIG. 11, the dotted lines indicate waveforms during a normal operation. In the example illustrated in FIG. 11, in the part indicated by X1, the netA should have a potential at the L level, but since the TFT-C does not operate, the netA does not have a potential at the L level. The TFT-F therefore is not turned OFF, and at a time point indicated by X2, the clock signal (CKA) without any change leaks to the gate line GL(10). Further, at a time point indicated by X3, the clock signal (CKB) without any change leaks to the gate line GL(11) on the next stage.

<Embodiment 2>

Embodiment 2 is directed to modification examples of the arrangement of circuit blocks of the gate driver 11 in the liquid crystal display device 1 of Embodiment 1. FIG. 12A, FIG. 12B, FIG. 12C, and FIG. 12D illustrate exemplary arrangements of the circuit blocks of the gate driver 11 in the present embodiment. In each of the examples illustrated in FIGS. 12A to 12D, the output unit U1 is arranged at such a position interposed between the netA pulldown unit U3 and the netA pullup unit U2. In other words, the netA pullup unit U2 and the netA pulldown unit U3 are arranged on each side of the output unit U1 in a direction in which the output unit U1, the netA pullup unit U2, and the netA pulldown unit U3 are arrayed.

Figure 12A:
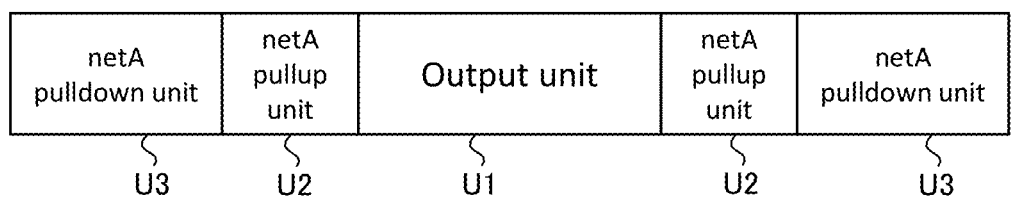
FIG. 12A illustrates an exemplary arrangement of circuit blocks of a gate driver 11 in Embodiment 2.
Figure 12B:
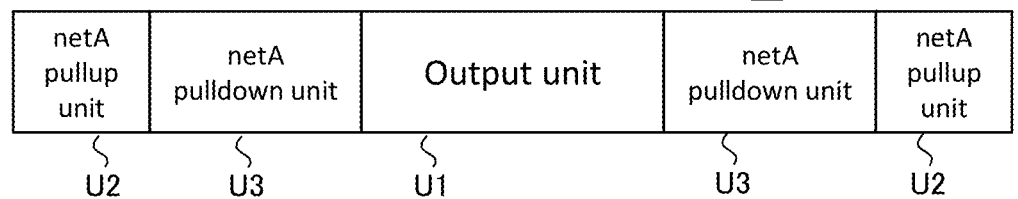
FIG. 12B illustrates an exemplary arrangement of circuit blocks of a gate driver 11 in Embodiment 2.
Figure 12C:
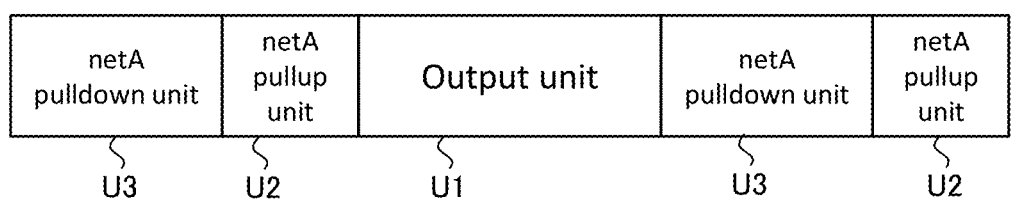
FIG. 12C illustrates an exemplary arrangement of circuit blocks of a gate driver 11 in Embodiment 2.
Figure 12D:
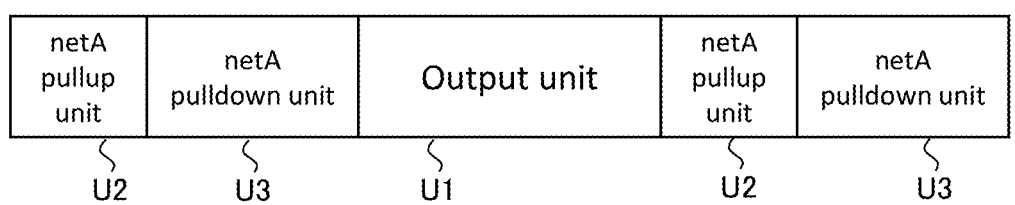
FIG. 12D illustrates an exemplary arrangement of circuit blocks of a gate driver 11 in Embodiment 2.

In the example illustrated in FIG. 12A, the netA pulldown unit U3, the netA pullup unit U2, the output unit U1, the netA pullup unit U2, and the netA pulldown unit U3 are arrayed in the stated order. In the example illustrated in FIG. 12B, the netA pullup unit U2, the netA pulldown unit U3, the output unit U1, the netA pulldown unit U3, and the netA pullup unit U2 are arrayed in the stated order. In the example illustrated in FIG. 12C, the netA pulldown unit U3, the netA pullup unit U2, the output unit U1, the netA pulldown unit U3, and the netA pullup unit U2 are arrayed in the stated order. In the example illustrated in FIG. 12D, the netA pullup unit U2, the netA pulldown unit U3, the output unit U1, the netA pullup unit U2, and the netA pulldown unit U3 are arrayed in the stated order. In FIGS. 12A and 12B, the netA pullup unit U2 and the netA pulldown unit U3 are arranged horizontally symmetrically with respect to the output unit U1 as the center.

Figure 13:
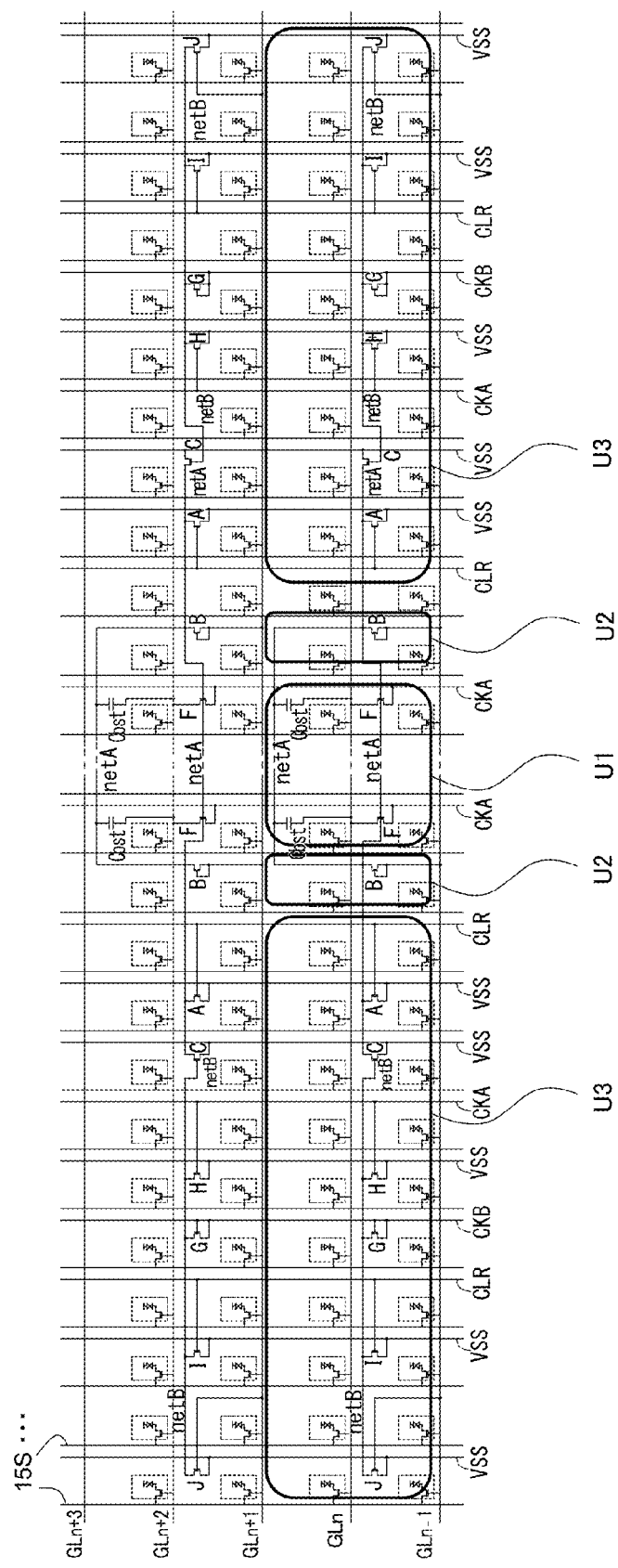
FIG. 13 illustrates an exemplary circuit configuration of the arrangement illustrated in FIG. 12A.

FIG. 13 illustrates an exemplary circuit configuration of the arrangement illustrated in FIG. 12A. In the output unit U1 illustrated in FIG. 13, a plurality of pairs of the TFTs-F and the capacitors Cbst are connected to the netA extending along the gate line GL. One pair of the TFT-F and the capacitor Cbst is provided with respect to each of the plurality of consecutive pixels. In this way, by providing a plurality of the TFTs-F and the capacitors Cbst, the capacitance of the last buffer can be increased and the output performance can be improved. In FIG. 13, only the pairs of the TFTs-F and the capacitors Cbst at both ends of the output unit U1 are illustrated, and the illustration of the pairs in an intermediate part is omitted. Further, the illustration of the gate drivers for the gate lines GLn+1, GLn+3 is omitted.

The netA of the output unit U1 is formed to extend to the pixels next to both ends of the pixels at which the output unit U1 is provided. To the lines netA that extend from both ends of the output unit U1, the TFTs-B of the netA pullup units U2 are connected. Thus, the TFTs-B of the netA pullup units U2 are arranged on both ends of the output unit U1. On a pixel that is, on a side opposite to the output unit U1, next to the pixels at which the netA pulldown unit U3 is arranged, the netA is formed by further extending thereto. To the netA further extending from the side opposite to the output unit U1 of the netA pullup unit U2, the TFT-A and the TFT-C of the netA pulldown unit U3 are connected. In this way, the TFTs of the netA pullup unit U2 and the TFTs of the netA pulldown unit are arranged on an array of pixels arrayed in the row direction, on both sides with respect to, as the center, the pixels at which the output unit U1 is provided.

Figure 14A:
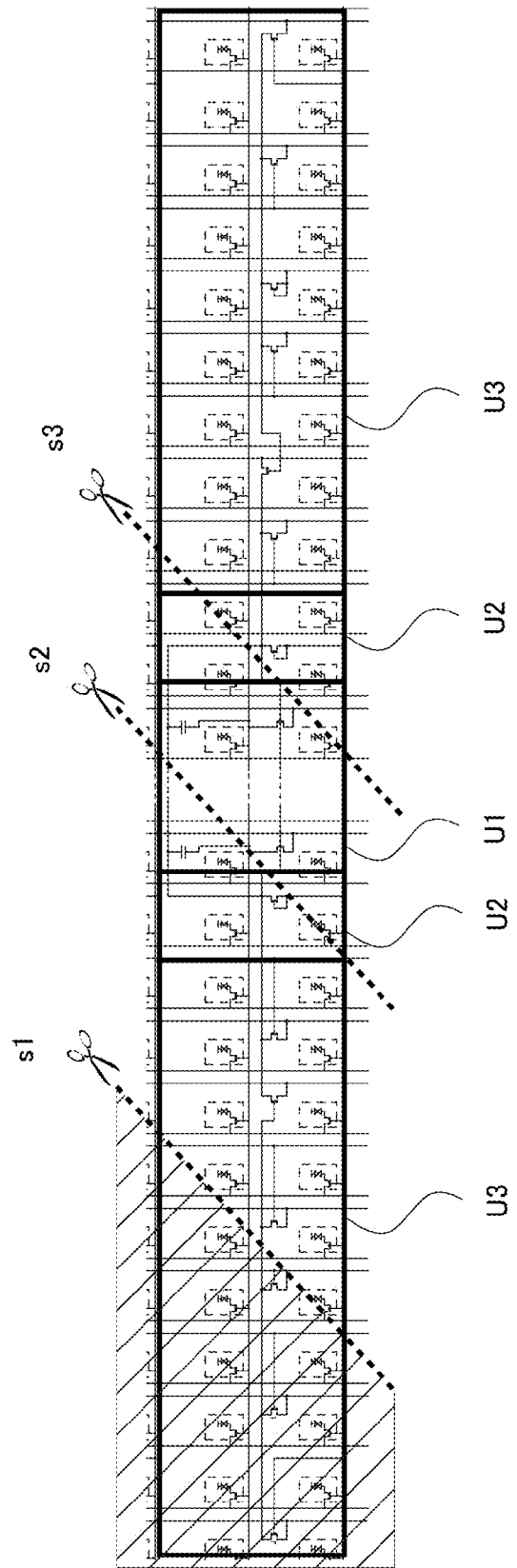
FIG. 14A illustrates an example of cutting of the left part of the gate driver 11 having the configuration illustrated in FIGS. 12A and 13.

FIG. 14A illustrates an example of cutting of the left part of the gate driver 11 having the configuration illustrated in FIGS. 12A and 13. Even if the function of the netA pulldown unit U3 on the right side is damaged by cutting along the cutting line S1 crossing the netA pulldown unit U3 on the left side as illustrated in FIG. 14A, there is another netA pulldown unit U3 on the right side of the output unit U1, which allows the gate driver 11 to continuously perform the normal operation.

Along the cutting line S2 crossing the output unit U1 and the netA pullup unit U2, some of the TFTs-F of the output unit U1 as well as the netA pullup unit U2 and the netA pulldown unit U3 on the left are cut away. In this case, some the TFTs-F of the last buffer of the output unit U1 are lost, but circuits required for operations remain on the right of the output unit U1, which allows a normal operation to be continuously performed. Here, according to the lost part of the TFTs-F, the output capability of the gate driver 11 decreases. Therefore, as the cutting line crossing the output unit U1 is shifted from left to right, the output capability decreases stepwise.

When all of the TFTs-F of the output unit U1 are cut away along the cutting line s3 shifted further rightward with respect to the cutting line s2, the output of the output of the gate driver 11 stops. Here, any abnormal signal is not output to the gate line to which the gate driver 11 is connected and other gate lines running in parallel.

Figure 14B:
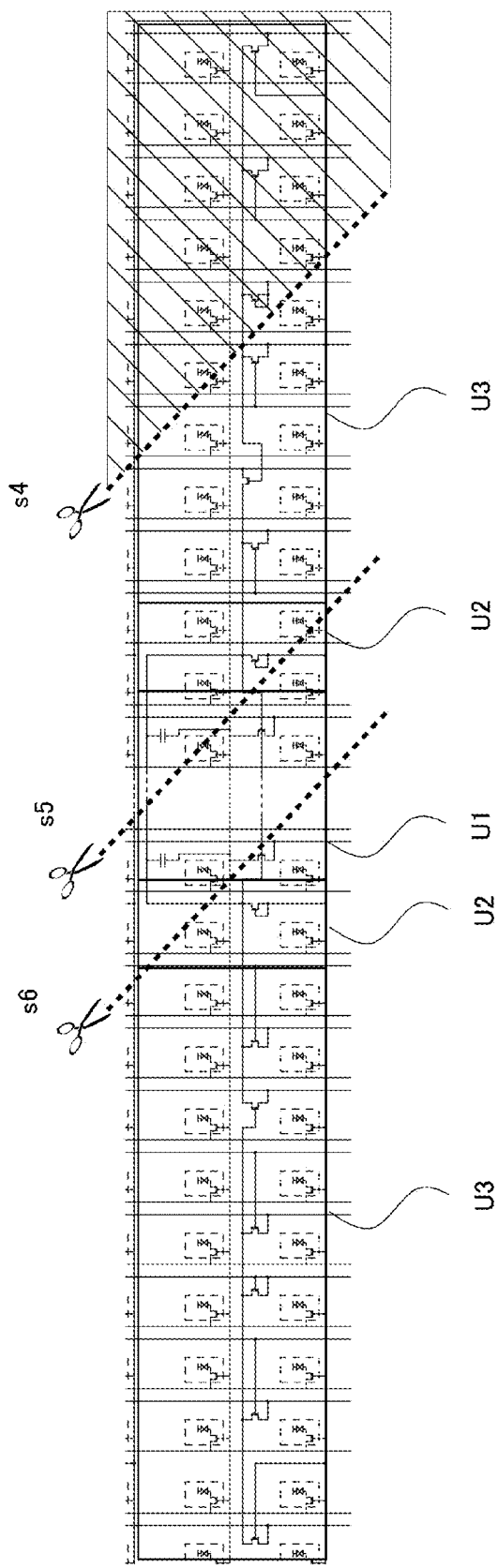
FIG. 14B illustrates an example of cutting of the right part of the gate driver 11 having the configuration illustrated in FIGS. 12A and 13.

FIG. 14B illustrates an example of cutting of the right part of the gate driver 11 having the configuration illustrated in FIGS. 12A and 13. In the example illustrated in FIG. 14B, even with the cutting along a cutting line s4 that crosses the netA pulldown circuit U3 on the right side, and the cutting along a cutting line s5 that cuts away some of the TFTs-F of the output unit U1 as well as the netA pullup circuit U2 and the netA pulldown circuit U3 on the right side thereto, the normal operation of the gate driver 11 is continued. With the cutting along a cutting line s6 that cuts away all of the TFTs-F of the output unit U1, the operation normally stops. In this case, as the cutting line crossing the output unit U1 is shifted from right to left, the output capability decreases stepwise.

In the examples illustrated in FIGS. 14A and 14B, in a case where the cutting line is shifted from left to right, and in a case where the cutting line is shifted from right to left, similarly, the output of the gate driver 11 start decreasing stepwise when the cutting line starts crossing the output unit U1. Then, in a case where all of the TFTs-F of the output unit U1 are cut away, the operation of the gate driver 11 normally stops. Thus, influences by cutting on the display quality in a case where the left side of the active matrix substrate is cut, and those in a case where the right side is cut, can be equalized. This makes it possible to suppress display quality reductions caused by cutting. Specific examples of this are described below.

Figure 15:
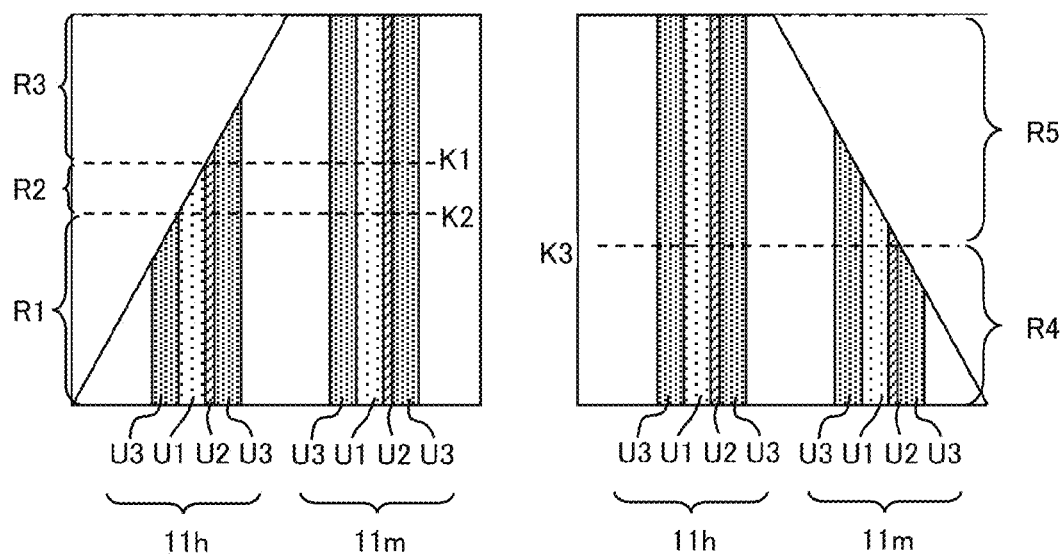
FIG. 15 is a view for explaining a cut form of the active matrix substrate and influences on display quality.

FIG. 15 is a view for explaining a cut form of the active matrix substrate and influences to display quality. In the gate drivers 11$h$, 11$m$ in the active matrix substrate illustrated in FIG. 15, the netA pulldown unit U3, the output unit U1, the netA pullup unit U2, and the netA pulldown unit U3 are arranged in the stated order from left. The left view in FIG. 15 illustrates an example in a case where a left-side part of the active matrix substrate is cut off along a cutting line that obliquely crosses an area where the gate driver 11$h$ on the left side is arranged. The right view in FIG. 15 illustrates an example in a case where a right-side part of the active matrix substrate is cut off along a cutting line that obliquely crosses an area where the gate driver 11$m$ on the right side is arranged.

In the example illustrated in the left view in FIG. 15, in an area R1 below a line K2, both of the gate driver 11$h$ on the left side and the gate driver 11 m on the right side operate. In an area R2 between the lines K2, the cutting line that cuts the output unit U1 of the gate driver 11$h$ on the left side shifts inward as going upward. Accordingly, the output capability of the gate driver 11$h$ decreases stepwise. Irregularities in the display caused by decreases in the output capability of the gate driver 11$h$, therefore, are not noticeable. In the area above the line K1, only the gate driver 11$m$ on the right side operates.

In contrast, in the case of the right view in FIG. 15, the output capability of the gate driver abruptly changes at a position where the dividing line crosses the netA pullup unit U2 on the right side of the gate driver 11. In other words, in an area R4 below the line K3, the two gate drivers 11h, 11m operate, and in an area R5 above the line K3, one gate driver 11h operates. This causes display irregularities caused by decreases in the output capability of the gate driver 11 due to the cutting to become more noticeable, as compared with the case of the left view.

Further, by arranging the output unit U1 to a position interposed between the netA pullup unit U2 and the netA pulldown unit U3, a difference between the display quality in a case where the left part is cut and the display quality in a case where the right part is cut can be reduced. For example, FIGS. 16 and 17 illustrate cutting examples in a case where the output unit U1 is arranged at a position interposed between the netA pullup unit U2 and the netA pulldown unit U3.

Figure 16:
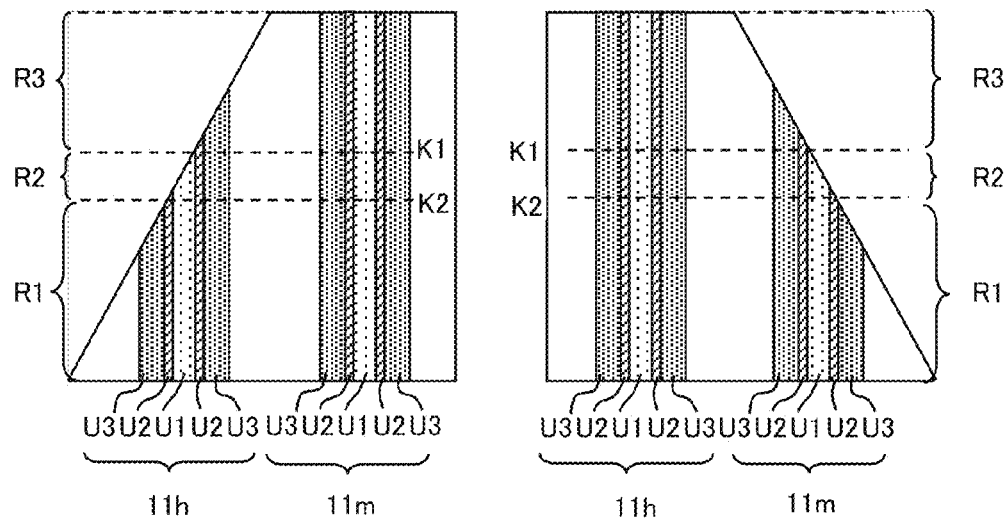
FIG. 16 is an example of cutting in a case where an output unit U1 is arranged at a position interposed between a netA pullup unit U2 and a netA pulldown unit U3.

In gate drivers 11h, 11 illustrated in FIG. 16, the netA pulldown unit U3, the netA pullup unit U2, the output unit U1, the netA pullup unit U2, and the netA pulldown unit U3 are arranged in the stated order from left. The left view in FIG. 16 illustrates a case of cutting along a dividing line that crosses the gate driver 11h on the left, and the right view in FIG. 16 illustrates a case of cutting along a dividing line that crosses the gate driver 11m on the right. In either of both cases, the output capability of the output unit U1 changes stepwise in an area between the lines K1 and K2. Decreases in display quality, therefore, are not noticeable, in either of both cases almost equally.

Figure 17:
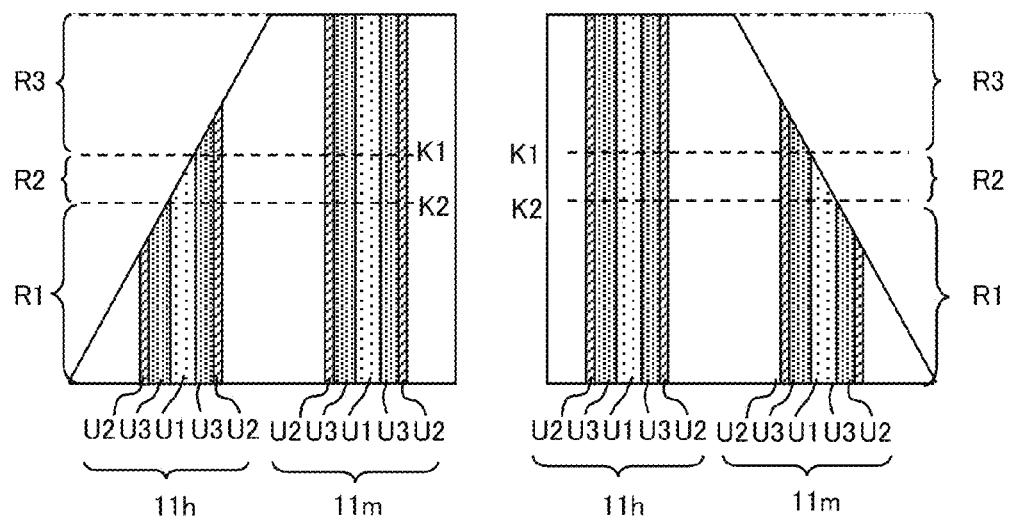
FIG. 17 is an example of cutting in a case where an output unit U1 is arranged at a position interposed between a netA pullup unit U2 and a netA pulldown unit U3.

In the gate drivers 11h, 11 illustrated in FIG. 17, the netA pullup unit U2, the netA pulldown unit U3, the output unit U1, the netA pulldown unit U3, and the netA pullup unit U2 are arranged in the stated order from left. The left view in FIG. 17 illustrates a case of cutting along a dividing line that crosses the gate driver 11h on the left, and the right view in FIG. 17 illustrates a case of cutting along a dividing line that crosses the gate driver 11m on the right. In either of both cases, the output capability of the output unit U1 changes stepwise in an area between the lines K1 and K2. Decreases in display quality, therefore, are not noticeable, in either of both cases almost equally.

<Embodiment 3>

Figure 18:
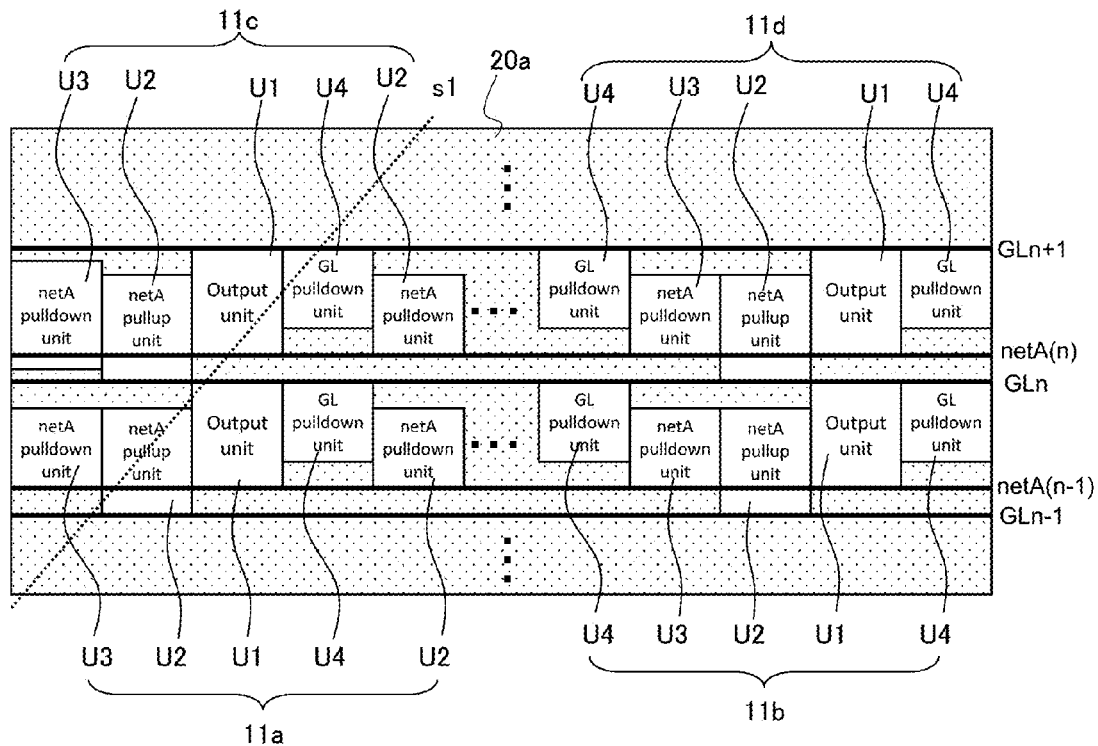
FIG. 18 illustrates an exemplary configuration of a gate driver in Embodiment 3.

Embodiment 3 is directed to a modification example of the configuration of the gate driver of Embodiment 1. FIG. 18 illustrates an exemplary configuration of the gate driver in Embodiment 3. In the example illustrated in FIG. 18, the netA is formed along the gate line GLn. The length of the gate line GLn and the length of the netA are approximately equal to each other. In other words, the netA is laid on the whole width of the display area. The length of the netA is accordingly equal to the width of the display area. To one netA, a plurality of gate drivers 11a to 11d are connected. One gate driver includes the output unit U1, the netA pullup unit U2, the netA pulldown unit U3, and the GL pulldown unit U4. Accordingly, the gate driver is arranged dispersedly on the whole width of the display area.

In the present embodiment, in each gate driver, the output unit U1 is not necessarily interposed between the netA pulldown units U3. The arrangement of the circuit blocks in each gate driver may be such that a certain pattern is repeated, or the circuit blocks may be arranged in a random order in each gate driver. FIG. 18 illustrates, as one example, a configuration in which a plurality of gate drivers are connected to one netA, the gate drivers including gate drivers 11a, 11c in each of which the netA pulldown unit U3, the netA pullup unit U2, the output unit U1, the GL pulldown unit U4, and the netA pulldown unit U3 are arranged in this order, and gate drivers 11b, 11d in each of which the GL pulldown unit U4, the netA pulldown unit U3, the netA pullup unit U2, the output unit U1, and the GL pulldown unit U4 are arranged in this order.

In this way, by connecting a plurality of gate drivers to the netA, which is formed to extend similarly to the gate line, a plurality of gate drivers having the same function can be dispersed spatially, whereby a circuit having redundancy is formed. This allows such a configuration to be realized that even if a part of the display panel is lost by cutting, the function of the gate drivers is not damaged.

Figure 19:
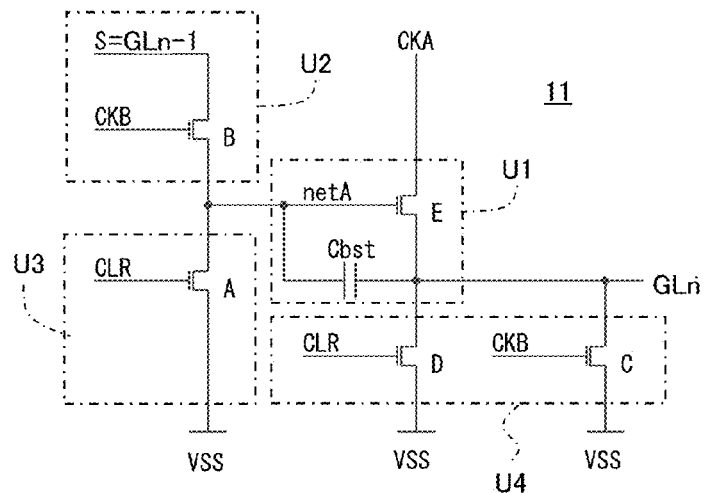
FIG. 19 is an equivalent circuit diagram illustrating an exemplary circuit of a gate driver in which a netB is omitted.
Figure 20:
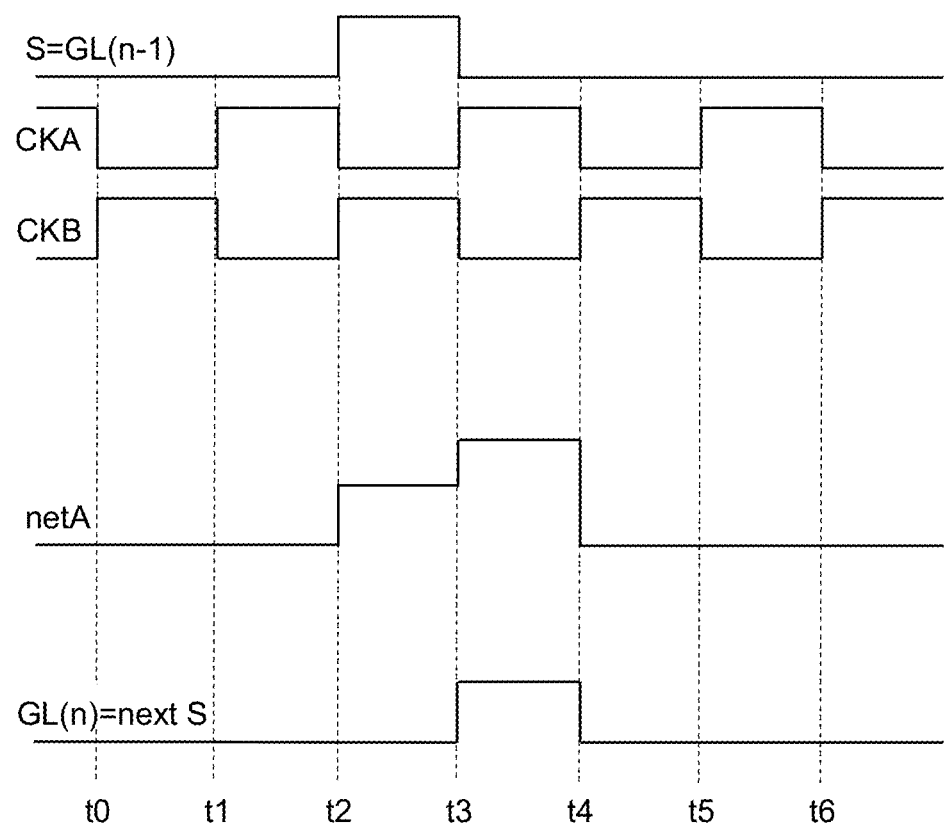
FIG. 20 is a timing chart illustrating exemplary signal waveforms when the gate driver illustrated in FIG. 19 is operating.

The circuit configuration of the gate driver in the present embodiment may be the same as the configuration illustrated in FIG. 4, but it is not limited to this. For example, a circuit having such a configuration that the netB in the circuit illustrated in FIG. 4 is omitted can be used. This makes the circuit configuration simple, thereby increasing the aperture ratio of the pixels. FIG. 19 is an equivalent circuit diagram illustrating an exemplary circuit of a gate driver in which a netB is omitted. FIG. 20 is a timing chart illustrating exemplary signal waveforms when the gate driver illustrated in FIG. 19 is operating. The circuit configuration illustrated in FIG. 19 can be used in Embodiments 1 and 2.

In the example illustrated in FIG. 19, the output unit U1 includes a TFT-E and a capacitor Cst connected between the netA and the gate line GLn. The output unit U1 is the last buffer for accumulating a voltage to be applied to the gate line GLn.

The netA pullup unit U2 includes a TFT-B connected between the netA and the gate line GLn-1 on the previous stage. The drain of the TFT-B is connected to the gate line GLn-1 on the previous stage, the gate thereof is connected to the control signal line of the clock signal CKB, and the source thereof is connected to the netA. The TFT-B controls connection/disconnection between the netA and the gate line GLn-1 on the previous stage according to the clock signal CKB, thereby controlling the pulling up/down of the potential of the netA. The netA pullup unit U2, therefore, can be also referred to as a netA pullup/pulldown unit.

The netA pulldown unit U3 includes a TFT-A connected between the netA and the control signal line for the power source voltage signal VSS at the L level. The drain of the TFT-A is connected to the netA, the gate thereof is connected to the control signal line for the reset signal CLR, and the source thereof is connected to the control signal line for the power source voltage signal VSS. The TFT-A causes the potential of the netA to change to the level of the power source voltage signal VSS at a timing designated by the reset signal CLR.

The GL pulldown unit U4 includes a TFT-D and a TFT-C that are provided between the gate line GLn and the control signal line for the power source voltage signal VSS at a predetermined level (low level). The drain of the TFT-D is connected to the gate line GLn, the gate thereof is connected to the control signal line for the reset signal CLR, and the source thereof is connected to the control signal line for the power source voltage signal VSS. The drain of the TFT-C is connected to the gate line GLn, the gate thereof is connected to the control signal line for the clock signal CKB, and the source thereof is connected to the control signal line for the power source voltage signal VSS.

The reset signal CLR can be at the H level, for example, for a certain period before the start of scanning of the gate line. In this case, the reset signal CLR is at the H level every one vertical period. The rising of the reset signal CLR to the H level resets the netA and the gate line GL to the L level (the level of the power source voltage signal VSS).

At the gate lines GLn+1, GLn-1 on the next stage and the previous stage, the connection with CKA and CKB is exchanged. For example, on the next stage and on the previous stage, the control signal line for the clock signal CKB is connected to the drain of the TFT-E, and the control signal line for the clock signal CKA is connected to the gate of the TFT-B and the gate of the TFT-C.

In the example illustrated in FIG. 20, the clock signal (CKA) at the L level is input to the drain of the TFT-E from a time t0 to a time t1, whereby the clock signal (CKB) at the H level is input to the gate of the TFT-B and the gate of the TFT-C. This causes the TFT-B and the TFT-C to be turned ON and causes the TFT-E to be turned OFF, thereby causing the netA to be charged to the power source voltage (VSS) at the L level. To the gate line GLn, therefore, the potential at the L level is output.

Next, at the time t1, when the clock signal (CKA) rises to the H level and the clock signal (CKB) falls to the L level, the TFT-B and the TFT-C are turned OFF, which causes the potential of the netA to be maintained at the L level, thereby causing the gate line GLn to maintain the potential at the L level.

At a time t2, the clock signal (CKA) falls to the L level and the clock signal (CKB) rises to the H level, and the set signal S is input to the drain of the TFT-B via the gate line GLn−1 on the previous stage. This causes the TFT-B to be turned ON, and causes the netA to be charged to the H level. Further, since the TFT-E is turned OFF, the potential of the netA does not fall, but is maintained. Since the TFT-C is in the ON state during this period, the potential of the gate line GLn is at the L level.

At a time t3, when the clock signal (CKA) rises to the H level and the clock signal (CKB) falls to the L level, the TFT-E is turned ON, and the TFT-C is turned OFF. Since the capacitor Cbst is provided between the netA and the gate line GLn, the netA is charged to a potential higher than the H level of the clock signal (CKA), as the potential of the drain of the TFT-F rises. Here, the potential of the clock signal (CKA) at the H level is output to the gate line GLn. This causes the gate line GLn to shift to the selected state, and the set signal S is output to the gate driver 11 of the gate line GLn+1 on the next stage.

At a time t4, when the clock signal (CKA) falls to the L level and the clock signal (CKB) rises to the H level, the TFT-B is turned ON, which causes the netA to be charged to the L level. Further, the TFT-E is turned OFF and the TFT-C is turned ON, which causes the gate line GLn to be charged to the L level. This causes the gate line GLn to return to the non-selected state. Thereafter, during the holding period, with the clock signal (CKB) and the TFT-C, the L level of the gate line GLn is maintained.

Figure 21:
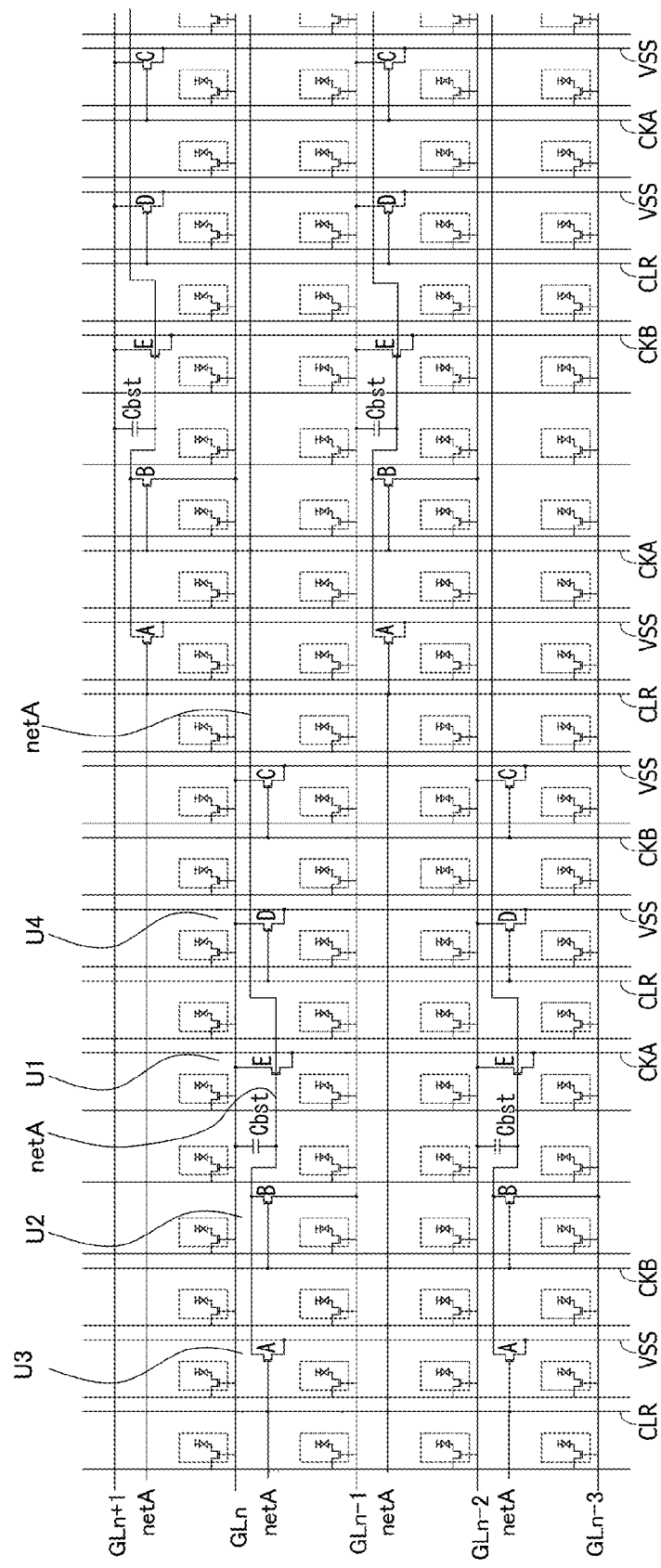
FIG. 21 illustrates an exemplary circuit configuration in a case where the gate driver 11 illustrated in FIG. 19 is arranged in a display area.
Figure 22:
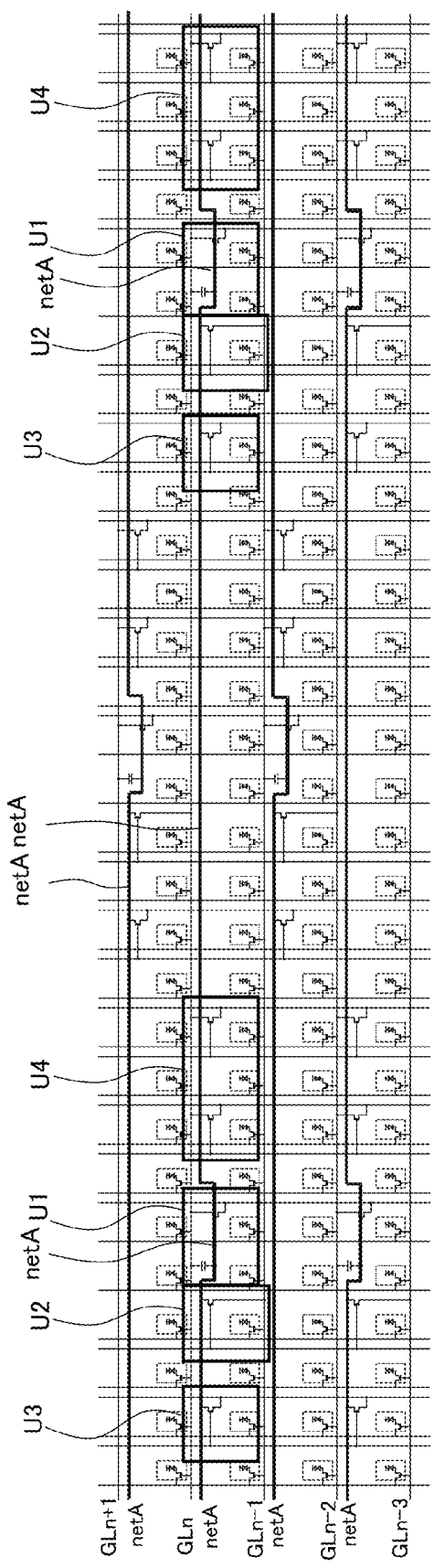
FIG. 22 illustrates an exemplary circuit configuration in a case where the gate driver 11 illustrated in FIG. 19 is arranged in a display area.

FIGS. 21 and 22 illustrate exemplary circuit configurations in a case where the gate driver 11 illustrated in FIG. 19 is arranged in the display area. In the example illustrated in FIG. 21, the netA connected to the TFT-E is led out from the pixel at which the TFT-E of the output unit U1 is arranged, to the pixels on both sides, and extends along the gate line GLn, over all the pixels in the same row. The netA led out of the pixel at the output unit U1 to the pixel on the left side is connected to the TFT-B at pixels at which the netA pullup unit U2 is arranged. The netA is formed to extend from the pixels at the netA pullup unit U2 further to the pixel on the left side. At the pixels where the netA pulldown unit U3 is arranged, on the left side of the pixels where the netA pullup unit U2 is arranged, the netA is connected to the TFT-A. To the pixels on the left side of the pixels at the netA pullup unit U2 as well, the netA is extended and formed.

The netA extending from the pixels at the output unit U1 to the pixels on the right side passes through the pixels at which the GL pulldown unit U4 is formed, to the pixel array further on the right side. Though not illustrated in FIG. 21, at the pixel array further on the right side, the output unit U1, the netA pullup unit U2, and the netA pulldown unit U3 of another gate driver are connected to the netA.

As illustrated in FIG. 22, the netA extends over the pixels in one row. At the pixels in one row, two output units U1 are arranged at positions separated by a plurality of pixels. Similarly, at the pixels in one row, two netA pullup units U2 are arranged at positions separated by a plurality of pixels, and further, two netA pulldown units U3 are arranged at positions separated by a plurality of pixels. To one line netA extending over the pixels in one row, TFTs of two gate drivers are connected, which are provided at positions separated by a plurality of pixels.

In this way, by arranging a plurality of gate drivers at the pixels in one row, and connecting the lines netA of these gate drivers with each other, a malfunction of the gate drivers due to cutting of some of circuit parts of the gate drivers can be prevented from occurring.

Figure 23:
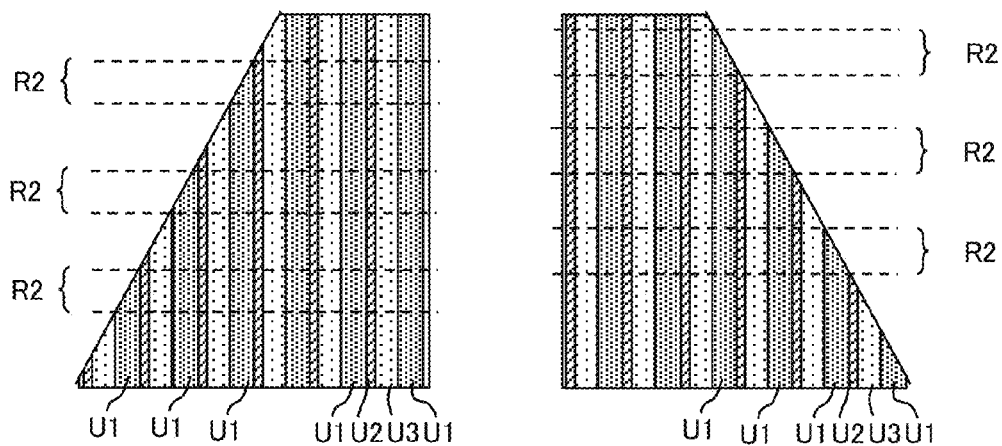
FIG. 23 illustrates an example of cutting of an active matrix substrate that includes the gate driver of the present embodiment.

FIG. 23 illustrates an example of cutting of an active matrix substrate that includes the gate driver of the present embodiment. On the active matrix substrate illustrated in FIG. 23, a plurality of gate drivers in each of which the netA pulldown unit U3, the output unit U1, the netA pullup unit U2, and the netA pulldown unit U3 are arranged in the stated order from the left are arranged in a direction in which the gate line extends. The left view in FIG. 23 illustrates an example in a case where a left-side part of the active matrix substrate is cut off along a cutting line that obliquely crosses an area where the gate drivers are arranged. The right view in FIG. 23 illustrates an example in a case where a right-side part of the active matrix substrate is cut off along a cutting line that obliquely crosses an area where the gate drivers are arranged.

In the example illustrated in FIG. 23, in both cases of the case where the left-side part is cut and the case where the right-side part is cut, the output capability of the gate driver decreases stepwise, in an area R2 cut along the cutting line crossing the output unit U1. The output unit U1 that the cutting line crosses is connected by the netA to the netA pullup unit U2 and the netA pulldown unit U3 of other gate drivers on the same row. In a case where a part of the last buffer TFT of the output unit U1 is cut off, therefore, the operation can be continued even though the output capability decreases for the part thus cut off. As a result, irregularities caused by changes in the output capability of the gate driver are not noticeable. Further, the difference between the display quality in the case where the right-side part is cut and the display quality in the case where the left-side part is cut is small.

<Embodiment 4>

Figure 24:
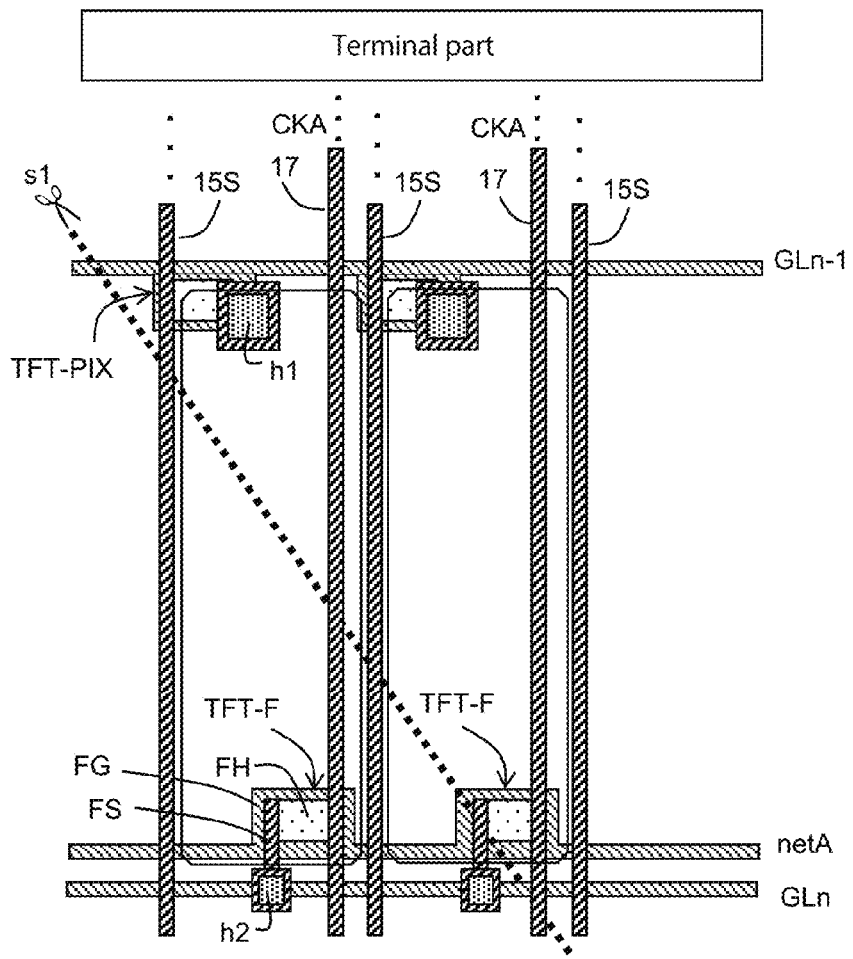
FIG. 24 illustrates an exemplary netA arrangement in Embodiment 4.

Embodiment 4 is directed to exemplary arrangements of the net A in the above-described Embodiments 1 to 3. FIG. 24 illustrates an exemplary netA arrangement in Embodiment 4. FIG. 24 illustrates an exemplary layout in the vicinity of two pixels surrounded by two adjacent gate lines GLn, GLn−1, and three source lines 15S that intersect with the gate lines GLn, GLn−1. At each pixel, TFTs-PIX connected to the source line 15S and the gate line GLn−1 are provided. Further, a netA is formed along the gate line GLn. To the netA, a TFT-F as the last buffer of the output unit U1 is connected. The TFT-F is connected to a control signal line 17 for the clock signal CKA and the gate line GLn. In other words, the netA is connected to the gate line GLn via the output unit U1. The control signal line 17 and the source line 15S are connected to a terminal part provided on one side of the frame area outside the display area.

In the example illustrated in FIG. 24, the netA is arranged between the gate line GLn and a side of the frame area where the terminal part is provided. In other words, the netA is arranged on a side where terminals to which signals of the source lines or the control signals are input are provided, with respect to the gate line GLn. In this way, by providing the netA on a side to which control signals are input, with respect to the gate line GLn, an abnormal operation due to cutting along a cutting line that passes through the output unit U1 or the vicinities thereof can be prevented from occurring.

As an example, a case illustrated in FIG. 24 where a part on a side opposite to the terminal part (the lower part in the drawing) with respect to the cutting line s1 is cut away is described. In this case, the cutting is at a position between the remaining TFT-T and the gate line GLn, leaking of a signal to the gate line GLn does not occur, even if the TFT-F is turned ON due to influences of the surroundings.

Figure 25A:
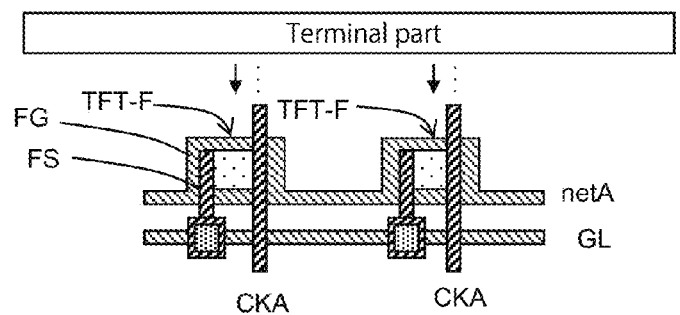
FIG. 25A illustrates the relationship between a gate line and a netA that are connected with each other through TFTs-F of an output unit U1.
Figure 25B:
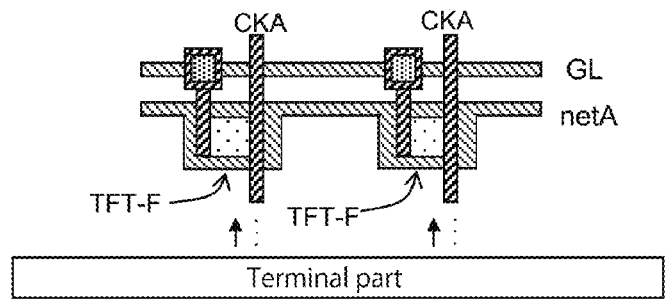
FIG. 25B illustrates the relationship between a gate line and a netA that are connected with each other through TFTs-F of an output unit U1.

FIGS. 25A and 25B illustrate the relationship between the gate line and the netA that are connected with each other through TFTs-F of the output unit U1. As illustrated in FIGS. 25A and 25B, the netA connected through the TFTs-F to the gate line GLn is arranged on the terminal side with respect to the gate line GLn, and this makes it possible to cause the TFTs-F to be disconnected from the gate line GLn by the cutting, or to prevent the gates of the TFTs-F from becoming floating.

Further, in the examples illustrated in FIGS. 25A and 25B, the configuration is such that there is no branch of the lines between the netA and the TFTs-F connected between the netA and the gate line GLn. Here, the line of the netA is connected to one side of each gate electrode of the TFT-F. The gate electrodes of the TFTs-F and the netA are connected in such a manner that one side of each gate electrode of the TFT-F is along the direction in which the netA extends. In this way, the gate electrodes of the TFTs-F and the line of the netA are integrally formed, whereby a configuration that does not include a branch of the lines can be achieved.

Figure 26:
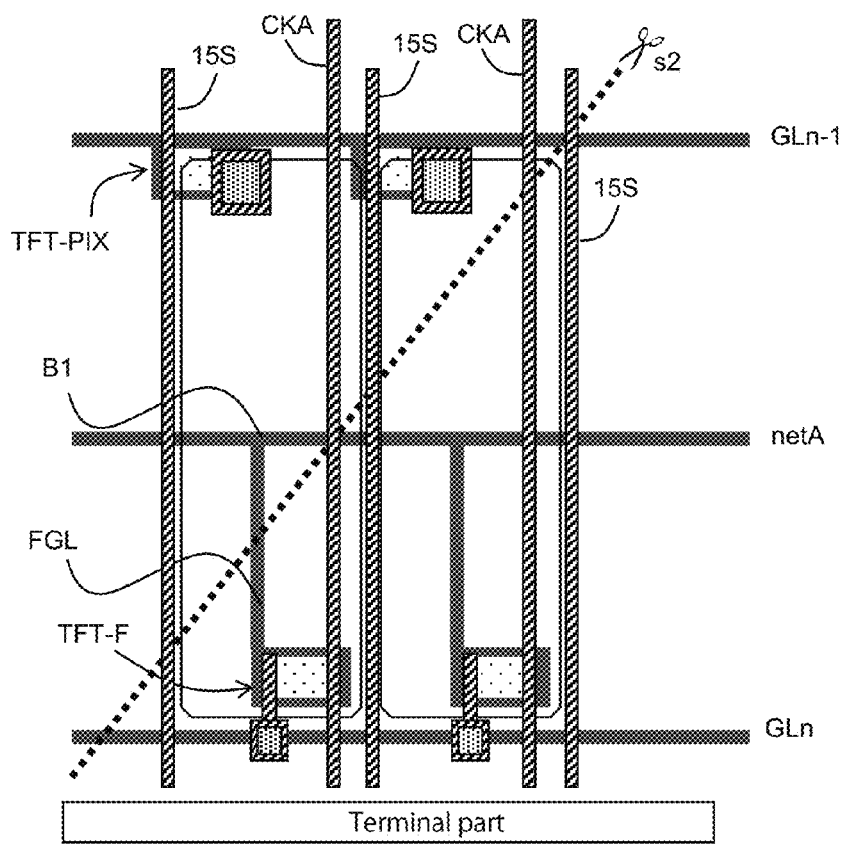
FIG. 26 illustrates an exemplary case where a netA connected via TFTs-F to a gate line GLn is arranged on a side opposite to a terminal part with respect to the gate line GLn.
Figure 27A:
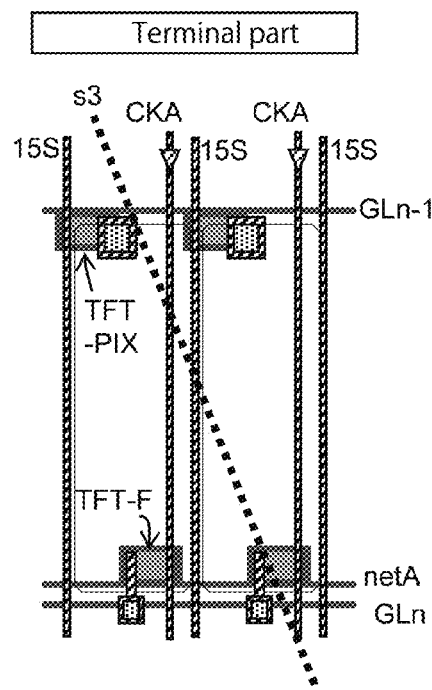
FIG. 27A illustrates an exemplary case where an active matrix substrate including the configuration illustrated in FIG. 25 is cut along a cutting line s3.
Figure 27B:
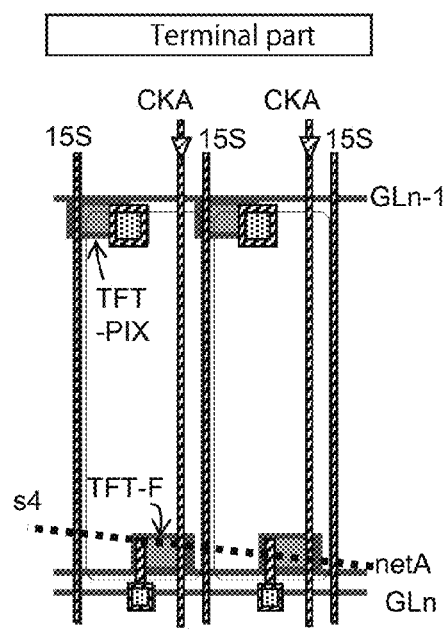
FIG. 27B illustrates an exemplary case where an active matrix substrate including the configuration illustrated in FIG. 25 is cut along a cutting line s4.
Figure 27C:
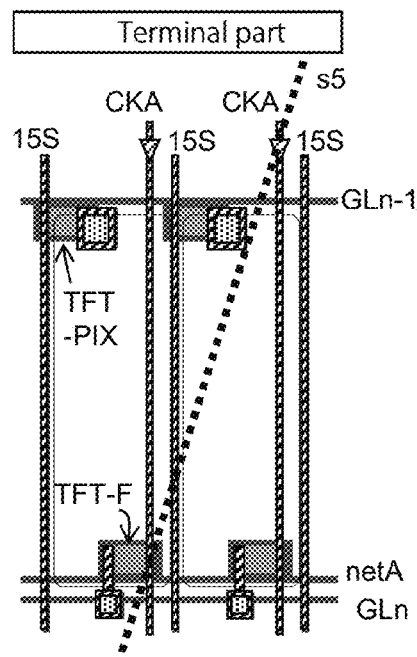
FIG. 27C illustrates an exemplary case where an active matrix substrate including the configuration illustrated in FIG. 25 is cut along a cutting line s5.
Figure 27D:
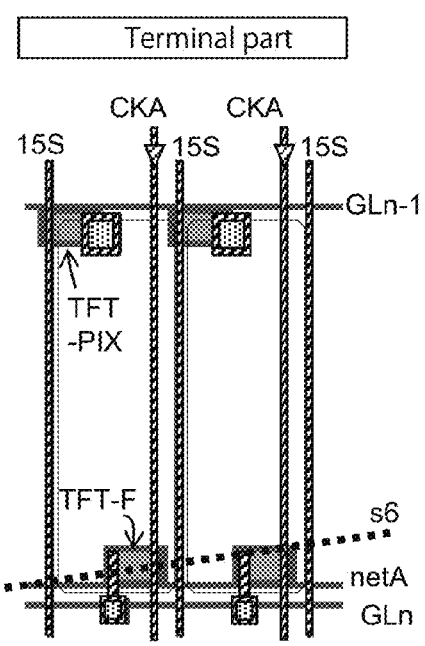
FIG. 27D illustrates an exemplary case where an active matrix substrate including the configuration illustrated in FIG. 25 is cut along a cutting line s6.
Figure 27E:
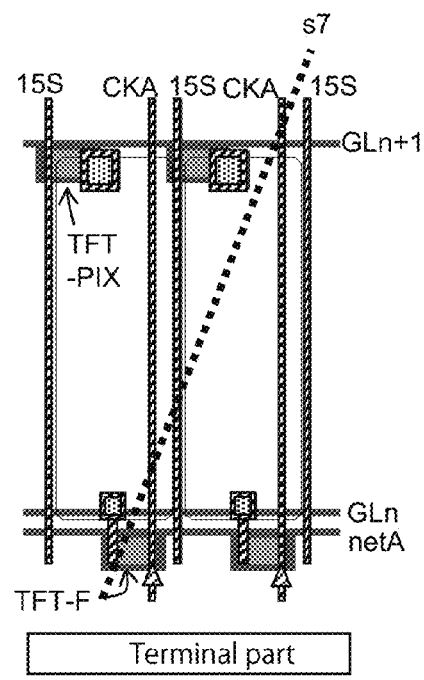
FIG. 27E illustrates an exemplary case where an active matrix substrate including the configuration illustrated in FIG. 25 is cut along a cutting line s7.
Figure 27F:
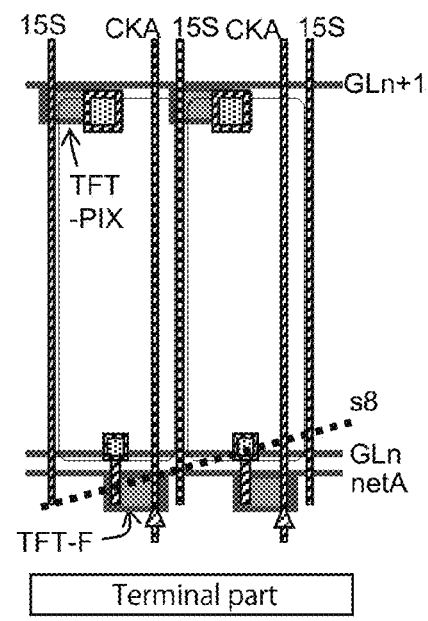
FIG. 27F illustrates an exemplary case where an active matrix substrate including the configuration illustrated in FIG. 25 is cut along a cutting line s8.
Figure 27G:
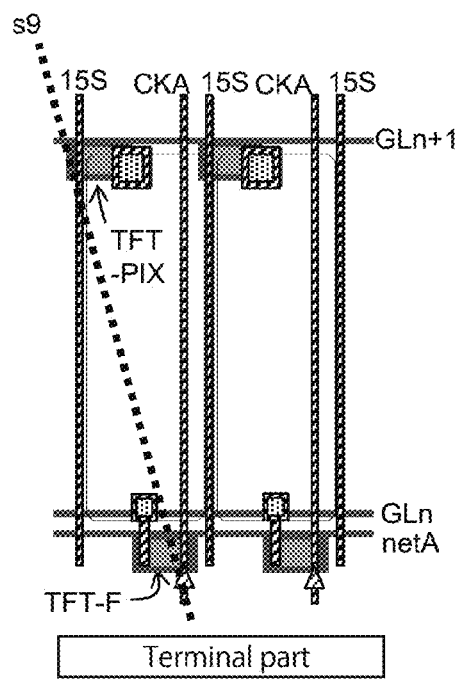
FIG. 27G illustrates an exemplary case where an active matrix substrate including the configuration illustrated in FIG. 25 is cut along a cutting line s9.
Figure 27H:
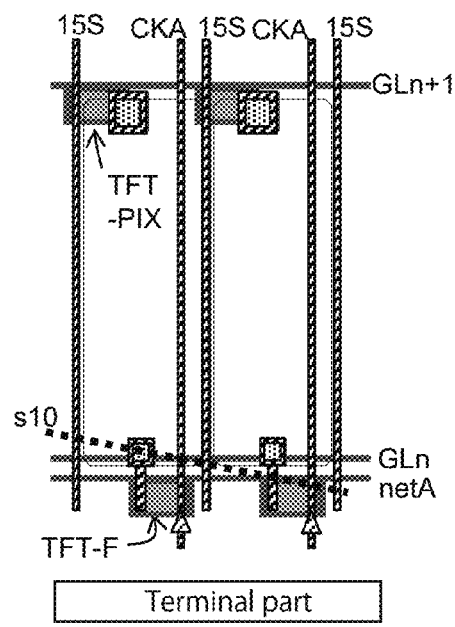
FIG. 27H illustrates an exemplary case where an active matrix substrate including the configuration illustrated in FIG. 25 is cut along a cutting line s10.

FIG. 26 illustrates an exemplary case where the netA connected via the TFTs-F to the gate line GLn is arranged on a side opposite to the terminal part with respect to the gate line GLn. In the configuration illustrated in FIG. 26, in a case where a part on the side opposite to the terminal part with respect to the cutting line s2 is cut away, the cutting is at a position between the netA and the gates of the TFTs-F, the TFTs-F and the gate line GLn remain being connected. In this case, the gates of the TFTs-F become floating. When the potentials of the gates of the TFTs-F that have become floating are boosted up by capacitive coupling with the control signal lines, the gate line, or the like, the TFTs-F are turned ON, and the clock signal CKA flows into the gate line GLn erroneously, which causes an abnormal operation.

FIGS. 27A to 27H illustrate exemplary cases where an active matrix substrate including the configuration illustrated in FIG. 25 is cut along cutting lines s3 to s10, respectively, the cutting lines s3 to s10 being in a plurality of patterns, respectively. In FIGS. 27A to 27H, in cases where a part on a side opposite to the terminal part with respect to the cutting lines s3 to s10 is cut away, respectively, the TFTs-F do not become floating, or the TFTs-F are disconnected with the gate line GLn by cutting. An abnormal operation, therefore, does not occur.

<Embodiment 5>

Figure 28:
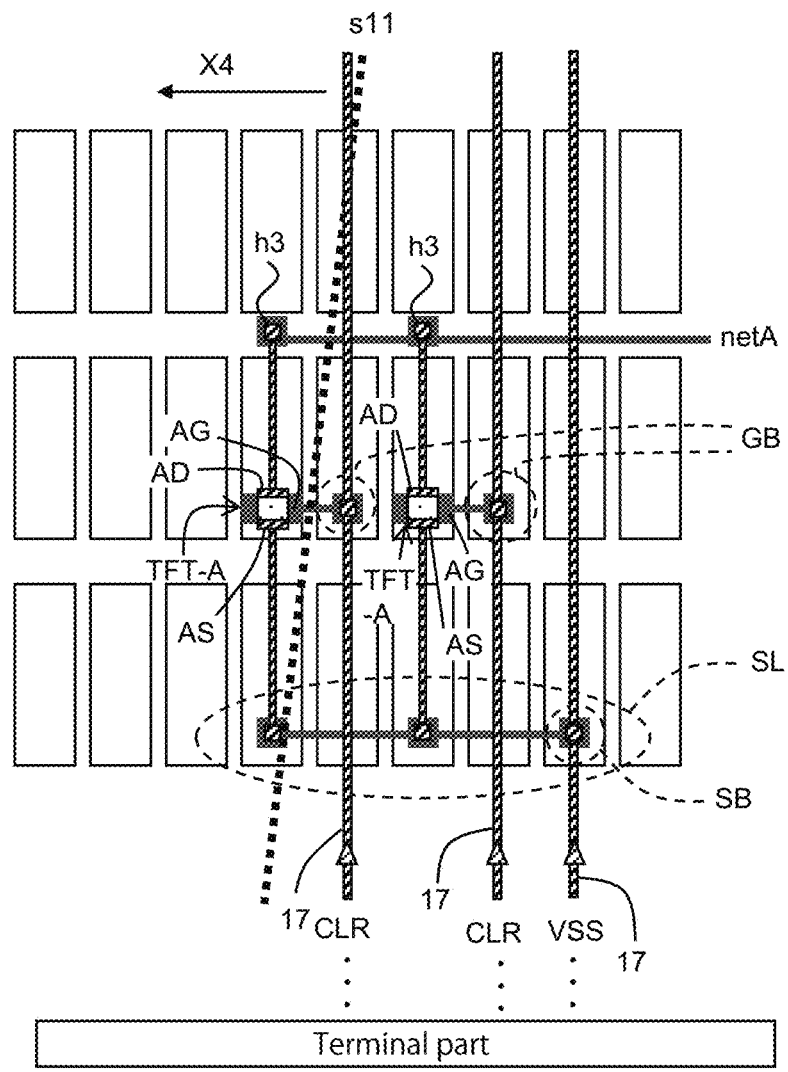
FIG. 28 illustrates an exemplary arrangement of TFTs-A and control signal lines 17 in Embodiment 5.

Embodiment 5 relates to an arrangement of the TFTs included in the gate drivers and the control signal lines in Embodiments 1 to 4. The arrangement in the present embodiment 5 can be applied to Embodiments 1 to 4 and combinations of at least two of these. FIG. 28 illustrates an exemplary arrangement of the TFTs-A and the control signal lines 17 in Embodiment 5.

FIG. 28 illustrates TFTs-A as exemplary switching elements of the gate drivers connected to the control signals. A line that branches from a line extending in the same direction as the source line of the control signal lines 17 and extends from inside of the driver arrangement area to outside is connected to the TFTs-A. In FIG. 28, a direction indicated by an arrow X4 is the direction directed from inside of the driver arrangement area to outside. More specifically, the line SL, directed from inside of the driver arrangement area to outside, extends from a branch SB of the control signal line 17 for VSS. This line SL is connected to a line led from the source AS of the TFT-A to a terminal part side. With this, the control signal line 17 for VSS is connected to the TFT-A, from the terminal part side.

A line directed from inside of the display area to outside, extending from a branch GB of the control signal line 17 for the CLR signal, is connected to the gate of the TFT-A. With this, the control signal line 17 for the CLR signal is connected to the TFT-A, from the inside of the driver arrangement area.

In this way, in a case where the control signal line connected to the TFT of the gate driver branches, the line can branch from a line that extends from the center of the driver arrangement area toward outside. In other words, the control signal line can be arranged on the center side with respect to the TFT.

Figure 29:
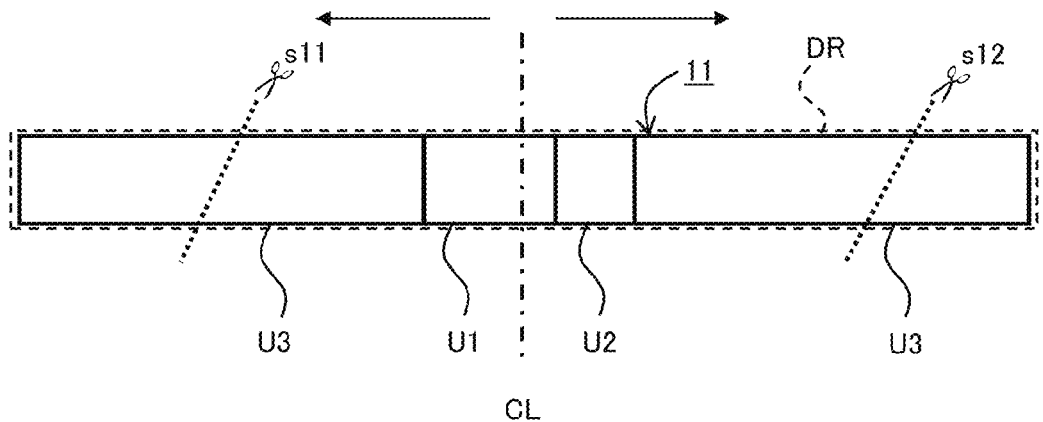
FIG. 29 illustrates an example of a driver arrangement area.

Here, the driver arrangement area can be, for example, an area where one gate driver is arranged. The area where the gate driver 11 is arranged, more specifically, can be an area of pixels at which TFTs composing the gate driver 11 are arranged. FIG. 29 illustrates an exemplary driver arrangement area. As illustrated in FIG. 29, an area where one gate driver 11 formed with the netA pulldown unit U3, the output unit U1, the netA pullup unit U2, and the netA pulldown unit U3 arrayed in the stated order is provided can be a driver arrangement area DR. In this case, in FIG. 29, the direction indicated by the arrow, that is, the direction outward from a center line CL that equally divides the driver arrangement area DR in the horizontal direction (the direction of the gate lines) is the direction from inside of the driver arrangement area to outside. In the present embodiment, a line from inside of the driver arrangement area DR to outside extends from the branch of the control signal line, and is connected to TFTs. In other words, the control signal line is arranged at a position closer to the center line CL of the driver arrangement area, than to the TFTs. This makes it possible to suppress an abnormal operation caused by cutting of the driver arrangement area. Here, the center line CL does not necessarily have to be a line that strictly equally divides the driver arrangement area DR into two.

For example, even if an outside part of the driver arrangement area is cut away along a cutting line s11 illustrated in FIGS. 28 and 29, it is possible to cut away the TFT-A and leave the control signal line. The gate of the TFT-A, therefore, does not remain floating. In other words, a TFT does not remain in a state that would cause an abnormal operation. In a case where the inner side part with respect to the cutting line s11 is cut away, the output unit U1 is also cut away, and hence, no false signal is output to the netA, the gate line, and the like. This also applies to a case where an outer side part or an inner side part with respect to the cutting line s12 illustrated in FIG. 29 is cut away.

Figure 30:
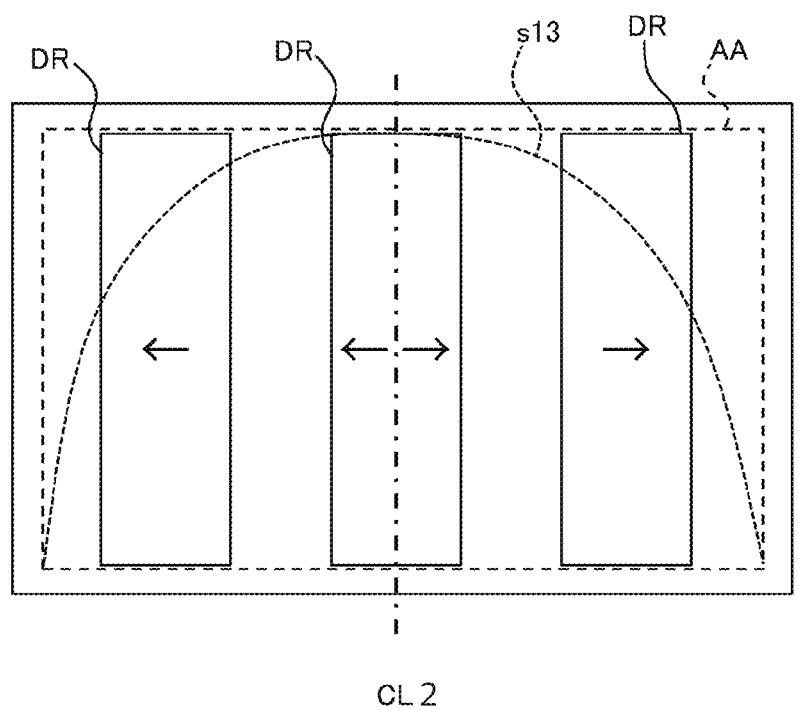
FIG. 30 illustrates an example of a display area AA and driver arrangement areas.

By causing the control signal line to branch from inside of the display area to outside so as to be connected to the TFTs, similarly, an abnormal operation caused by cut can be suppressed. FIG. 30 illustrates an example of a display area AA and driver arrangement areas. In the example illustrated in FIG. 30, three driver arrangement areas DR are arrayed in the horizontal direction (the direction in which the gate lines extend) in the display area AA. In each driver arrangement area DR, a plurality of gate drivers are arrayed in the vertical direction (the direction in which the source lines extend) (not shown). In this case, the directions (the directions indicated by the arrows in FIG. 30) directed outward from a center line CL2 that equally divides the display area AA in the horizontal direction can be the directions from the inside of the display area AA to outside.

In FIG. 30, the configuration can be such that in each gate driver, a line branching from a control signal line in a direction directed from the inside of the display area AA to outside is connected to a TFT. In this case, the control signal line connected to the TFT is arranged at a position closer to the center line CL2 than to the TFT. With this configuration, for example, even in a case where the outer part with respect to the cutting line s13 in FIG. 30 is cut away, the control signal line remains and the TFT is cut away, resulting in that the TFT does not remain in a state that would cause an abnormal operation. In this way, a configuration in which a line that branches from a control signal line and is directed from the inside of the display area to outside is connected to a TFT of a gate driver can be applied to a gate driver of any one of Embodiments 1 to 3 described above. Further, the configuration of Embodiment 4 described above and this configuration can be combined.

The following description describes other characteristics of the present embodiment, while referring to FIG. 28 again. In the example illustrated in FIG. 28, the TFT-A and the control signal line 17 are connected by a line led out from the terminal side or the center side with respect to the TFT-A. In this way, by connecting a line branching from a control signal line to a side of the TFT that is a side to the inside of the driver arrangement area, or by connecting the line to a terminal part side of the TFT, an abnormal operation due to cutting is more surely prevented from occurring. In FIG. 28, in a case where a part on a side opposite to the terminal part with respect to the cutting line s11 is cut off, the connection of the TFT-A with the netA, i.e., a line other than the control signal line, tends to be cut. More specifically, the control signal line 17 for VSS is connected to a line led out on the terminal part side of the TFT-A. Therefore, in a case where a part on a side opposite to the terminal part is cut away along the cutting line s11, the TFT-A is cut away and the line on the control signal line 17 side remains. In other words, the TFT does not remain in a state that would cause an abnormal operation. The present example is in such a configuration that a line branching from a control signal line is connected to a side of the TFT that is a side to the inside of the driver arrangement area, or a terminal part side of the TFT. As a modification example of this configuration, for example, the line branching from the control signal line may be connected to a side of the TFT that is a side to the inside of the display area, or the terminal part side of the TFT.

The configuration of the present embodiment, however, is not limited to the example illustrated in FIG. 28. For example, the configuration may be such that, in FIG. 28, the gate line or the netB, in place of the netA, or in addition to the netA, is connected to the TFT. Further, the control signal line connected to the TFT may be a line that supplies a signal other than the signals CLR and VSS, for example, a signal such as a clock signal. Further, the configuration may be such that one control signal line is connected to the TFT.

Figure 31:
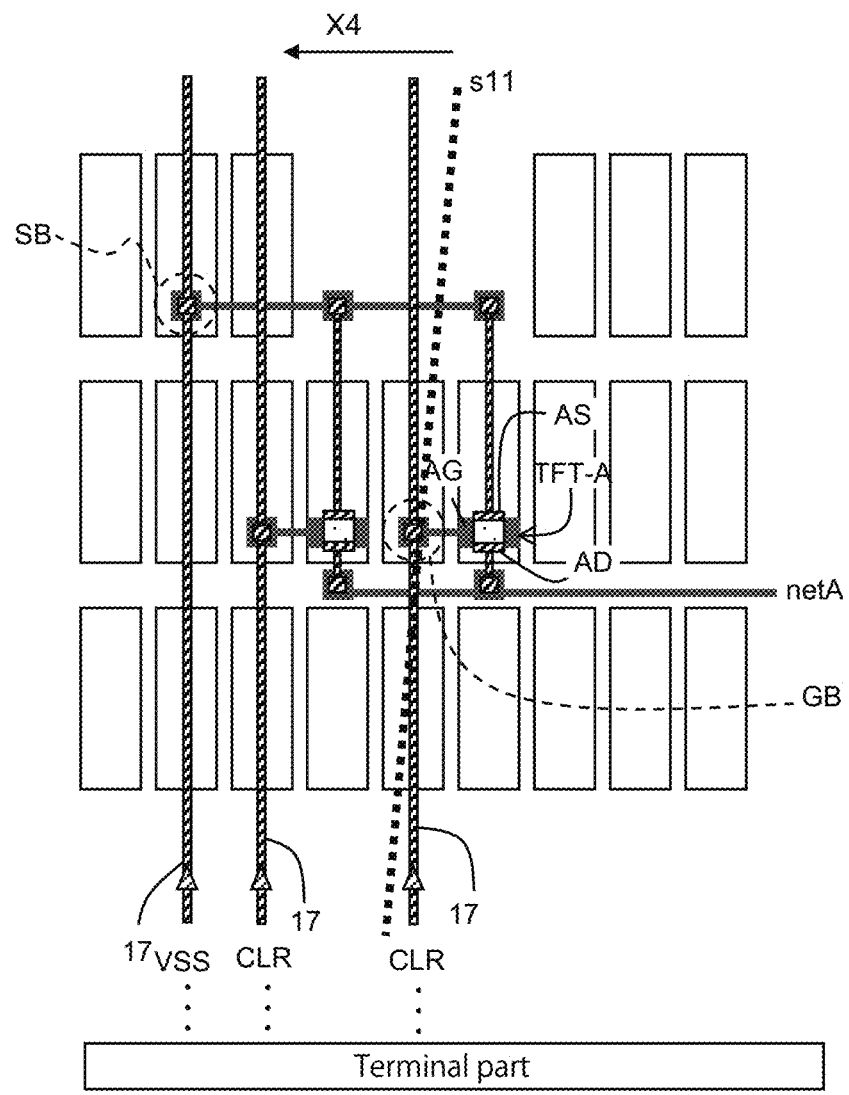
FIG. 31 illustrates a configuration in which a branch of a control signal line connected to a TFT is positioned on an outer side with respect to the TFT, and the control line is connected to a side of the TFT, the side being a side opposite to a terminal part.

FIG. 31 illustrates a configuration in which a branching of a line connected to a TFT is positioned on an outer side with respect to the TFT, and the control line is connected to a side of the TFT opposite to the terminal part side. In the configuration illustrated in FIG. 31, in a case where an outer part with respect to the cutting line s11 is cut away, the gate AG of the TFT-A remains in a state of floating. Further, since the TFT-A remains in a state where the netA is connected, the possibility that a false signal is output from the TFT-A to the netA is high.

<Other Modification Examples>

The invention of the present application is not limited to Embodiments 1 to 5 described above. For example, the invention of the present application can be applied to a rectangular-shape panel. In other words, a gate driver according to Embodiment 1 to 5 can be mounted on a rectangular shape panel. This makes it possible to suppress, for example, a malfunction occurring in a case where a part of the circuit of the gate driver has disconnection due to process failure.

In Embodiments 1 to 5 described above, the display panel 2 is a liquid crystal panel as an example, but the invention of the present application can be applied to a panel of a display style in which an active matrix substrate in which organic electro-luminescence (EL) or the like is used is driven.

The active matrix substrates and the display panels in the above-described embodiments and modification examples can be utilized for displays such as displays in smartphones or tablet terminals, speedometers of vehicles, and displays on pachinko machines, game machines, and the like.

DESCRIPTION OF REFERENCE NUMERALS 1 liquid crystal display device
2 display panel
11 gate driver (one example of gate line driving circuit)
13G, GL gate line
15S source line
20a active matrix substrate
U1 output unit
U2 netA pullup unit (one example of accumulated voltage supply unit)
U3 netA pulldown unit (one example of accumulated voltage adjustment unit)

The invention claimed is:
1. An active matrix substrate comprising:
  a gate line group including a plurality of gate lines that extend in a first direction in a display area;
  a source line group including a plurality of source lines that extend in a second direction that is different from the first direction, in the display area;
  a pixel electrode that is arranged in the display area, and is connected to the gate line and the source line; and
  a gate line driving circuit that is formed in the display area, and controls a voltage level of the gate line according to a control signal supplied from outside of the display area,
  wherein the gate line driving circuit includes:
    an accumulation line that accumulates a voltage for controlling the voltage level of the gate line;
    an output unit that controls the voltage level of the gate line according to the voltage of the accumulation line;

an accumulated voltage supply unit that varies the voltage of the accumulation line according to a signal input from another gate line; and at least two accumulated voltage adjustment units that change the voltage of the accumulation line to a predetermined level according to the control signal, and the output unit, the accumulated voltage supply unit, and the accumulated voltage adjustment unit are arranged along the gate line so as to be arrayed in the first direction, and the output unit is arranged at a position in the first direction that is interposed between the two accumulated voltage adjustment units.

2. The active matrix substrate according to claim 1, wherein the gate line driving circuit includes at least two of the accumulated voltage supply units, and the output unit is arranged at a position in the first direction that is interposed between the two accumulated voltage supply units.

3. The active matrix substrate according to claim 1, wherein the accumulation line is formed along the gate line to extend in the first direction, and a plurality of the gate line driving circuits are connected to the accumulation line.

4. An active matrix substrate comprising:

a gate line group including a plurality of gate lines that extend in a first direction in a display area;

a source line group including a plurality of source lines that extend in a second direction that is different from the first direction, in the display area;

a pixel electrode that is arranged in the display area, and is connected to the gate line and the source line; and a gate line driving circuit that is formed in the display area, and controls a voltage level of the gate line according to a control signal supplied from outside of the display area, wherein the gate line driving circuit includes:

an accumulation line that accumulates a voltage for controlling the voltage level of the gate line;

an output unit that controls the voltage level of the gate line according to the voltage of the accumulation line;

an accumulated voltage supply unit that varies the voltage of the accumulation line according to a signal input from another gate line; and at least two accumulated voltage adjustment units that change the voltage of the accumulation line to a predetermined level according to the control signal, and the accumulated line is formed along the gate line to extend in the first direction, and a plurality of the gate line driving circuits are connected to the accumulation line.

5. The active matrix substrate according to claim 1, further comprising:

a control signal line that supplies the control signal to the gate line driving circuit; and a first terminal part that is provided on one side of a frame area that is arranged outside a driver arrangement area where the gate line driving circuit is arranged, and that is connected to the control signal line, wherein the gate line driving circuit includes a switching element that is connected to the control signal line, and the switching element is connected, on a side thereof to the inside of the driver arrangement area, or on a side thereof to the first terminal part, with a line that branches from the control signal line and extends from inside of the driver arrangement area to outside.

6. The active matrix substrate according to claim 1, further comprising:

a control signal line that supplies the control signal to the gate line driving circuit; and a first terminal part that is provided on one side of a frame area that is arranged outside the display area, and that is connected to the control signal line, wherein the gate line driving circuit includes a switching element that is connected to the control signal line, the switching element is connected, on a side thereof to the inside of the display area, or on a side thereof to the first terminal part, with a line that branches from the control signal line and extends from inside of the display area to outside.

7. The active matrix substrate according to claim 1, further comprising:

a control signal line that supplies the control signal to the gate line driving circuit;

a first terminal part that is provided on one side of a frame area that is arranged outside the display area, and that is connected to the control signal line; and a second terminal part that is provided on the same side as the first terminal part, and is connected to the source line group.

8. The active matrix substrate according to claim 1, further comprising:

a control signal line that supplies the control signal to the gate line driving circuit; and a first terminal part that is provided on one side of a frame area that is arranged outside the display area, and that is connected to the control signal line, wherein the accumulation line connected to the gate line via the output unit is arranged between the gate line and a side where the first terminal part is provided.

9. The active matrix substrate according to claim 1, wherein the output unit includes a switching element connected between the accumulation line and the gate line, and an electrode of the switching element and the accumulation line are connected in such a manner that one side of an outer shape of the electrode of the switching element is along a direction in which the accumulation line extends.

10. The active matrix substrate according to claim 1 wherein, among the gate lines in the gate line group, at least some of the gate lines are shorter than a maximum of a width of the display area in the first direction in which the gate lines extend.

11. A display panel comprising:

an active matrix substrate according to claim 1;

a counter substrate; and a liquid crystal layer interposed between the active matrix substrate and the counter substrate.

* * * * *